United States Patent
Lim

(10) Patent No.: US 9,568,919 B2
(45) Date of Patent: Feb. 14, 2017

(54) SYSTEM AND METHODS FOR AUTOMATICALLY LANDING AIRCRAFT

(71) Applicant: Aurora Flight Sciences Corporation, Manassas, VA (US)

(72) Inventor: Edward Lim, Belmont, MA (US)

(73) Assignee: Aurora Flight Sciences Corporation, Manassas, VA (US)

( * ) Notice: Subject to any disclaimer, the term of this patent is extended or adjusted under 35 U.S.C. 154(b) by 1179 days.

(21) Appl. No.: 13/659,463

(22) Filed: Oct. 24, 2012

(65) Prior Publication Data

US 2017/0001732 A1    Jan. 5, 2017

(51) Int. Cl.
  G05D 1/02    (2006.01)
  G05D 1/06    (2006.01)
  G01S 7/41    (2006.01)

(52) U.S. Cl.
  CPC ............ G05D 1/0684 (2013.01); G01S 7/411 (2013.01)

(58) Field of Classification Search
  CPC ..... G05D 1/0684; G05D 1/0251; B64C 13/20; B64C 2201/021; B64C 2201/026; B64C 2201/205; B64F 1/02; A62C 3/10; G01S 7/411
  USPC ......... 701/16, 492, 503, 509, 514, 519, 535; 73/170.31; 244/116
  See application file for complete search history.

(56) References Cited

U.S. PATENT DOCUMENTS

| | | | | |
|---|---|---|---|---|
| 6,064,924 A | * | 5/2000 | Fleischmann | G01S 7/411 244/116 |
| 2008/0027591 A1 | * | 1/2008 | Lenser | G05D 1/0251 701/2 |
| 2008/0269966 A1 | | 10/2008 | Markiton et al. | |
| 2009/0306840 A1 | | 12/2009 | Blenkhorn et al. | |
| 2010/0057278 A1 | | 3/2010 | Lee | |
| 2010/0228408 A1 | * | 9/2010 | Ford | G01C 21/165 701/16 |
| 2011/0066307 A1 | * | 3/2011 | Hiebl | G05D 1/0684 701/16 |
| 2011/0307126 A1 | | 12/2011 | Hogstrom | |
| 2012/0130566 A1 | | 5/2012 | Anderson | |
| 2012/0158222 A1 | * | 6/2012 | Ehlin | G01S 17/023 701/16 |
| 2012/0293987 A1 | * | 11/2012 | Espedal | E01F 3/00 362/145 |
| 2013/0001366 A1 | * | 1/2013 | Wolff | B64F 1/02 244/183 |

FOREIGN PATENT DOCUMENTS

| | | | |
|---|---|---|---|
| WO | WO2007086055 A1 | * | 8/2007 |
| WO | 2010/071505 A1 | | 6/2010 |

* cited by examiner

*Primary Examiner* — Marthe Marc-Coleman
(74) *Attorney, Agent, or Firm* — Michael Stanley Tomsa; McAndrews, Held & Malloy, Ltd.

(57) ABSTRACT

The present invention is directed to methods of determining a vessel-relative off-deck waypoint (VRODW) location comprising the steps of providing an aircraft in flight; determining vessel range and vessel bearing relative the aircraft; and determining the VRODW location using the range and bearing measurements of the vessel. The present invention is further directed to methods of landing an aircraft on a vessel.

29 Claims, 19 Drawing Sheets

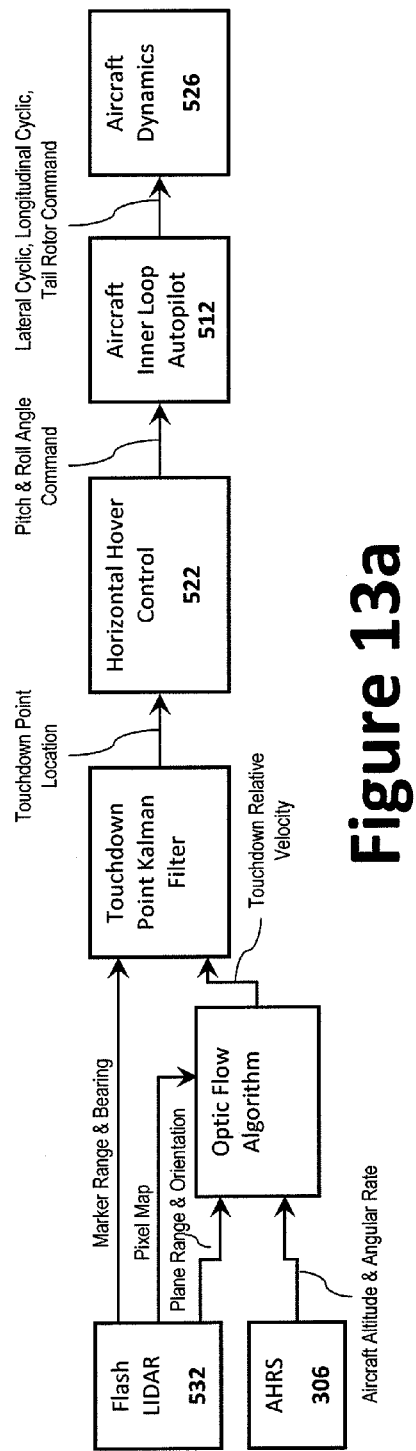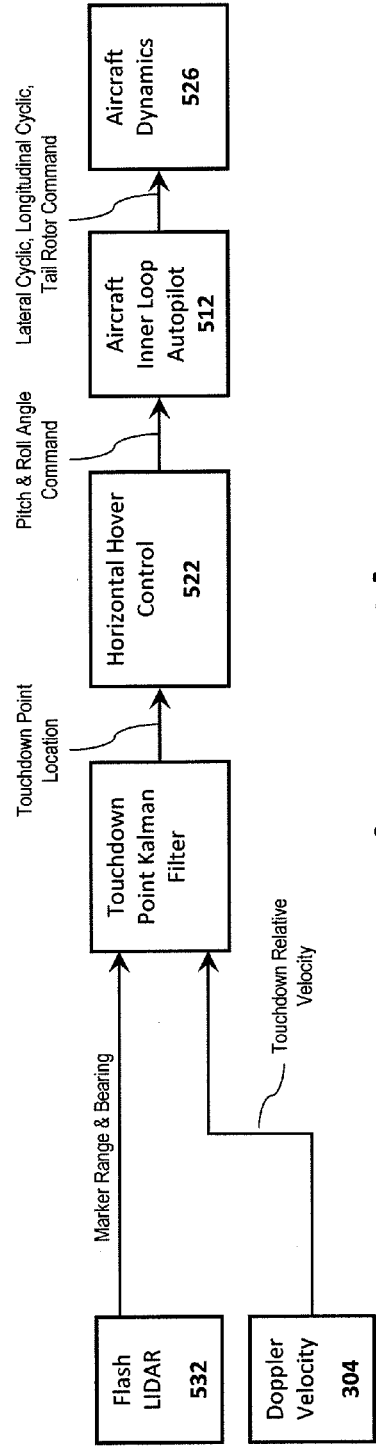

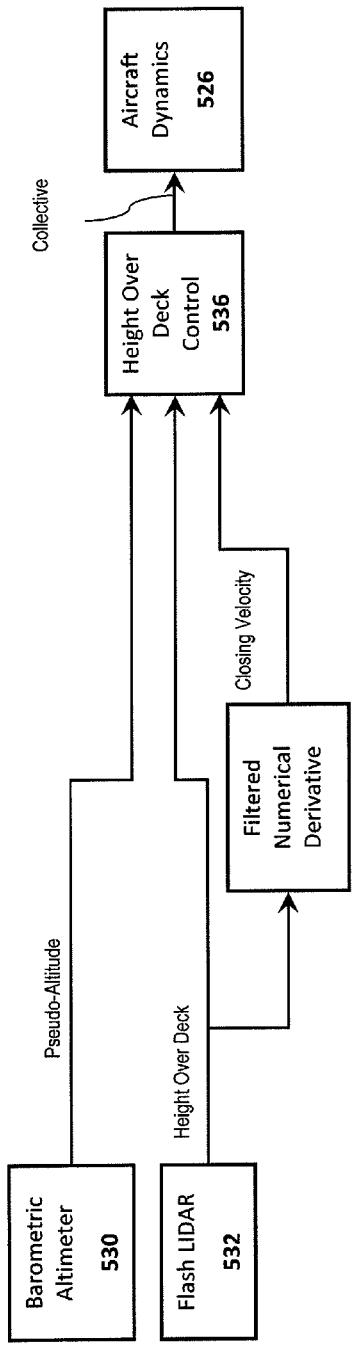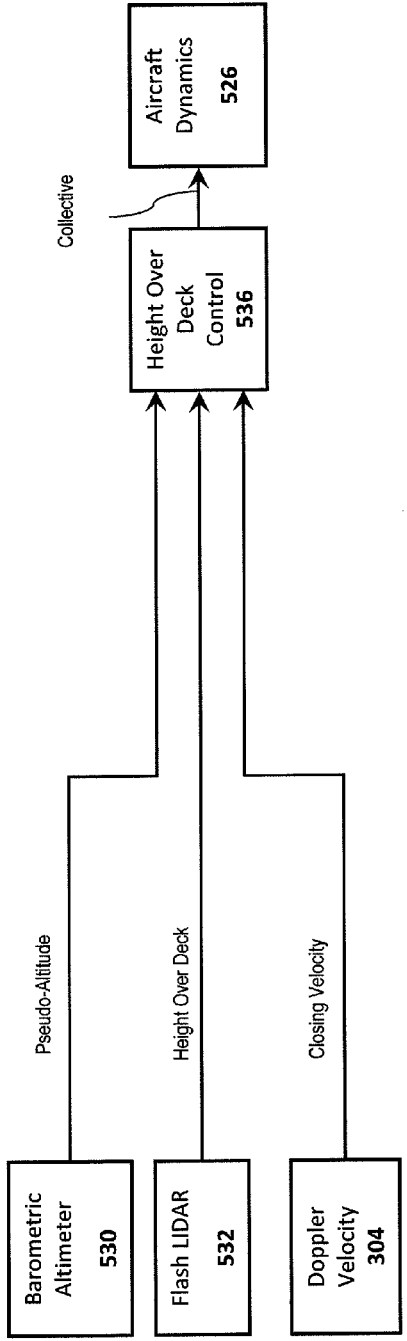

SYSTEM AND METHODS FOR AUTOMATICALLY LANDING AIRCRAFT

FIELD OF THE INVENTION

The present invention is directed to methods of determining a vessel-relative off-deck waypoint (VRODW) location comprising the steps of providing an aircraft in flight; determining vessel range and vessel bearing relative to the aircraft; and determining the VRODW location using the range and bearing measurements of the vessel. The present invention is further directed to methods of landing an aircraft on a vessel.

BACKGROUND OF THE INVENTION

Present day aircraft performing autonomous landings on naval vessels rely on a ship-mounted, radar-based landing system that is susceptible to component failures. Such a failure would require the aircraft to divert from the intended host platform to another radar-landing-system-equipped vessel or land-based facility. If an acceptably equipped alternate vessel or land facility is out of range or unavailable, a multi-million dollar asset would have to be ditched at sea.

Methods exist for measuring the relative altitude and attitude of an aircraft with respect to a surface. For example, U.S. Patent Application Publication Number 2012/0130566 to Anderson ("Anderson") discusses a system for facilitating autonomous landing of aerial vehicles on a surface, comprising beam emitting means directed downwards and control means to govern the vehicle, wherein the system is characterized in that it comprises image capturing means and processing means to process image data, wherein the beam emitting means are arranged to emit simultaneously at least four beams directed towards the surface in order to project a pattern thereon, wherein one beam emitting means of the at least four beam emitting means is placed in the centre; and that the image capturing means captures subsequent images of the pattern.

Similarly, U.S. Patent Application Publication Number 2011/0307126 to Hogstrom ("Hogstrom") discusses a system for predicting the movement of a surface for autonomous landing of unmanned aerial vehicles (UAVs), which comprises beam emitting means, control means, detector means to detect reflected beams, processing means to process measurements, and storing means to store the processed measurements, and which is characterized in that it comprises at least two beam emitting means, and in that each of the at least two beam emitting means is movable to measure along at least one line on the surface.

Other onboard landing systems rely on computer vision to interpret ship geometry from which the relative alignment of the aircraft can be deduced. For example, U.S. Patent Publication Number 2011/0307126 to Markiton, et al, which teaches a method and a device for assisting with flying an aircraft, which are intended to assist with flying the aircraft at least during an autonomous landing approach to a runway with a view to landing, particularly in the field of military aircraft. Similarly U.S. Patent Publication Number 2009/0306840 to Blenkhorn, et al teaches systems, methods, devices, and computer readable media for landing unmanned aerial vehicles using sensor input and image processing techniques. Finally U.S. Patent Publication Number 2010/0057278 to Lee teaches a system for automatically landing an aircraft using image signals, and, more particularly, to a system for automatically landing an aircraft using image signals and a method of controlling the system, which are capable of automatically landing an aircraft at a landing location using a landing mark provided at the landing location and imaging equipment configured to detect the landing mark.

Moreover, existing methods fail to address the complete problems of locating and approaching the ship from a distance, detecting the touchdown point and safely positioning the aircraft over the touchdown point, and tracking the touchdown point to touchdown. Finally, existing methods rely on ship-mounted, radar-based landing equipment which may provide unnecessary risks and limitations.

BRIEF SUMMARY OF THE INVENTION

The present invention provides systems and methods of determining a vessel-relative off-deck waypoint (VRODW) location. The present disclosure is further directed to systems and methods of landing an aircraft on a vessel.

In some embodiments, the present invention is directed to a method of determining a VRODW location comprising the steps of providing an aircraft in flight; determining vessel range and vessel bearing relative to the aircraft; and determining the VRODW location using the range and bearing measurements of the vessel. In some embodiments, the VRODW is located aft of the vessel. In some embodiments, the aircraft is a vertical take-off and landing aircraft (VTOL). In some embodiments, the aircraft determines the vessel range and vessel bearing. In some embodiments, the vessel range and vessel bearing is determined using a radar sensor. In some embodiments, the radar sensor is mounted onboard the aircraft.

In some embodiments, the method further comprises determining aircraft groundspeed and aircraft position in a local coordinate frame and determining vessel position and vessel velocity in the local coordinate frame from the range, vessel bearing, aircraft groundspeed, and aircraft position determinations. In some embodiments, aircraft groundspeed is determined using onboard Doppler radar, inertial navigation, satellite navigation, GPS, radio navigation, radio direction finding, or any combination thereof. In some embodiments, the aircraft position is determined by propagating aircraft groundspeed, inertial navigation, satellite navigation, GPS, radio navigation, radio direction finding, or any combination thereof.

In some embodiments, the vessel position and vessel velocity are determined using an algorithm. In some embodiments, the algorithm comprises a Kalman filter, extended Kalman filter, unscented Kalman filter, particle filter, least-squares estimator, recursive estimation algorithm, or any combination thereof. In some embodiments, a method of the present invention further comprises determining a vessel velocity vector, wherein the VRODW location is a fixed distance from the vessel along a negative vessel velocity vector.

In some embodiments, the radar sensor comprises a pulse radar, pulse Doppler radar, high-range resolution radar, pulse-compression radar, synthetic aperture radar, inverse synthetic aperture radar, imaging radar, tracking radar, track-while-scan radar, 3-D radar, phased-array radar, continuous-wave radar, frequency-modulated continuous-wave radar, or any combination thereof.

In other embodiments, the present invention is direct to a method of landing an aircraft on a vessel, comprising the steps of: providing an aircraft in flight at a VRODW location aft of the vessel; determining a vessel velocity vector; approaching the vessel from the VRODW along the vessel velocity vector; identifying a landing area of the vessel;

hovering the aircraft above the landing area; descending to the landing area; and landing the aircraft on the vessel.

In some embodiments, determining the vessel velocity vector comprises: determining vessel range and vessel bearing; determining aircraft groundspeed and aircraft position in a local coordinate frame; and determining vessel position and vessel velocity in the local coordinate frame using the vessel range, vessel bearing, aircraft groundspeed and aircraft position.

In other embodiments, the present invention is directed to a method of landing an aircraft on a vessel, comprising the steps of: providing an aircraft in flight at a VRODW location aft of the vessel; approaching the vessel from the VRODW; identifying a landing area of the vessel using LIDAR; hovering the aircraft above the landing area; descending to the landing area; and landing the aircraft on the vessel. In some embodiments, the LIDAR is scanning or flash LIDAR. In some embodiments, the landing area is designated on the vessel by a symbol. In some embodiments, the symbol is a circle, a cross, an H-shape, or other conventional symbols used on vessels to designate a landing area. In some embodiments, the method further comprises identifying a touchdown marker within the landing area.

In other embodiments, the present invention is directed to a method of landing an aircraft on a vessel, comprising the steps of providing an aircraft in flight; determining vessel range and vessel bearing; identifying a VRODW location using the vessel range and vessel bearing; moving the aircraft to the VRODW location; determining a vessel velocity vector; approaching the vessel from the VRODW along the vessel velocity vector; identifying a landing area on the vessel using LIDAR; hovering the aircraft above the landing area; descending the aircraft to the landing area; and landing the aircraft on the vessel.

In some embodiments, the aircraft is a vertical take-off and landing aircraft (VTOL). In some embodiments, the aircraft performs autonomous landing.

BRIEF DESCRIPTION OF THE FIGURES

These and other advantages of the present invention will be readily understood with reference to the following specifications and attached drawings, wherein:

FIG. 13a illustrates a block diagram for horizontal touchdown tracking guidance when operating high above the deck;

FIG. 13b illustrates a block diagram for horizontal touchdown tracking guidance when operating near the deck;

FIG. 14a illustrates a block diagram for height over deck guidance when operating high above the deck;

FIG. 14b illustrates a block diagram for height over deck guidance when operating near the deck;

DETAILED DESCRIPTION OF THE INVENTION

Figure 1:
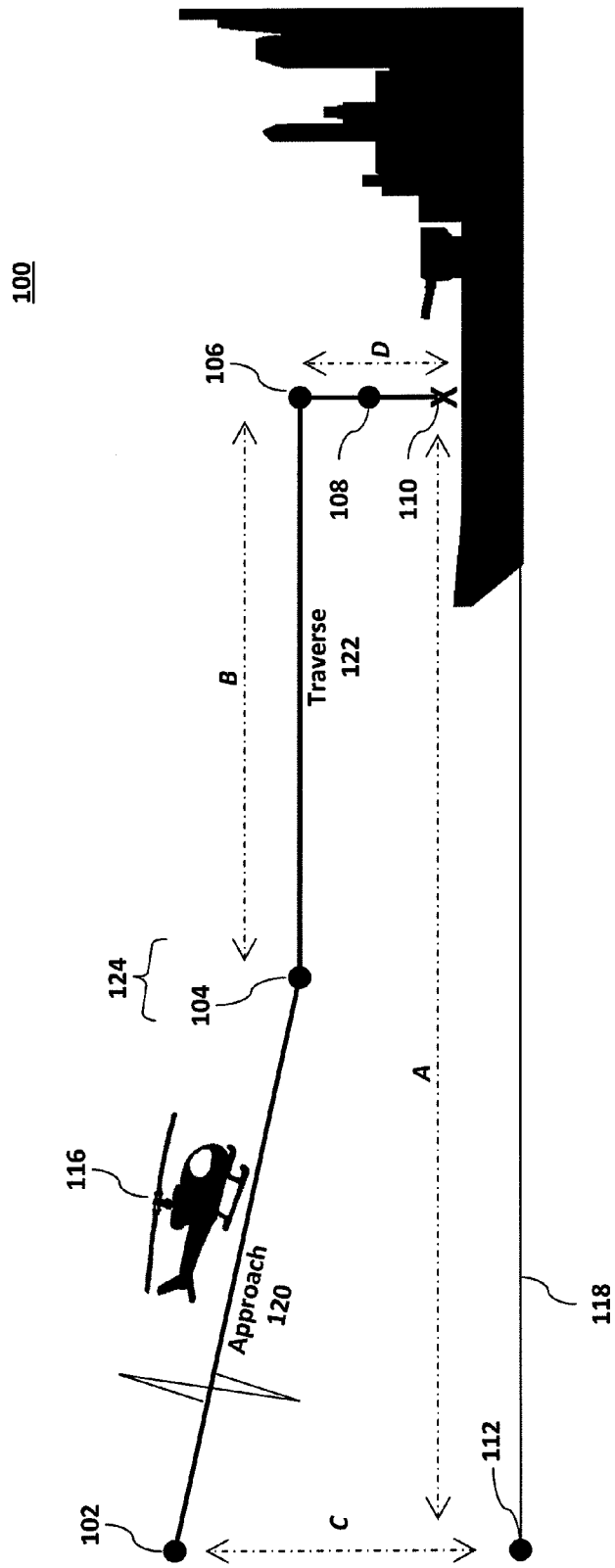
FIG. 1 illustrates a first example landing sequence.

Embodiments of the present invention will be described hereinbelow with reference to the accompanying drawings. In the following description, well-known functions or constructions are not described in detail because they would obscure the invention in unnecessary detail. The present invention provides an integrated sensor suite with associated algorithms and interfaces for executing vessel-board landings. The landing system may be completely self-contained onboard the aircraft, thereby eliminating the need for (i) vessel-board sensors, (ii) no data communication with the vessel (other than the command to land), and (iii) GPS to perform the landing operation. For this application, the following terms and definitions shall apply:

As used herein, the terms "communicate" and "communicating," refer to both transmitting, or otherwise conveying, data from a source to a destination and/or delivering data to a communications medium, system, channel, network, device, wire, cable, fiber, circuit, and/or link to be conveyed to a destination.

As used herein, the term "vessel" refers to a watercraft, ship, and/or boat, which may be capable of receiving and/or transporting an aerial vehicle. Vessels may include, for example, naval ships with VTOL decks, including: FFG Guided Missile Frigate, DDG Guided Missile Destroyer, LPD Amphibious Transport Dock Ship, LSD Dock Landing Ship, AE Ammunition Ship, and AO Oiler.

As used herein, the term "vessel-relative off-deck waypoint" or "VRODW" refers to an off-deck location relative to a vessel whereby an aircraft is able to reference as part of a landing sequence, including, for example, a perch point and/or initialization point.

As used herein, the term "vessel range" refers to a distance between an aircraft and target vessel.

As used herein, the term "vessel bearing" refers to the horizontal direction of the location of a vessel with respect to another horizontal direction, such as the horizontal orientation of an aircraft.

As used herein, the term "aircraft" refers to machines capable of flight, including, but not limited to VTOL aircraft. VTOL aircraft may include both fixed-wing aircraft (e.g., Harriers) and/or rotorcraft (e.g., helicopters).

As used herein, the phrase "radar" refers to an object-detection system which uses radio waves to determine the range, altitude, direction, and/or speed of objects.

As used herein, the phrase "radar sensor" refers to a sensor on equipment used in radar, a method for detecting the position and velocity of a distant object.

An objective of the present invention is to provide a VTOL Vessel-board Landing system that meets, or exceeds, the existing UAV Common Automatic Recovery System (UCARS), but without reliance on shipboard landing support equipment. The VTOL system may serve as either a primary or backup system. Thus, the VTOL system may be employed when an aircraft is required to land on a vessel that has no operational UCARS system. The VTOL system may be further configured to operate in a GPS-denied environment, thus requiring no communication with the vessel except for the C2 command to land, and operate across Naval vessels. Accordingly, no additional equipment is required on deck. In fact, deck lighting may even be shut off for operation in total darkness.

As will be discussed, a VTOL system may be designed to seamlessly operate across vessel platforms without required knowledge of vessel type. This approach has two advantages: (1) it eliminates vessel-specific information that would need to be calibrated and loaded onto the system per vessel type and (2) it eliminates any processing of vessel geometry which can be error prone and sensitive to vessel variations. To eliminate the need for vessel-specific information, the VTOL system may rely on features common to all vessels. The VTOL landing system may use, for example, a landing circle, vessel position, and vessel velocity.

Various parameters during a landing sequence, discussed below, may be detected or measured using sensors onboard the aircraft. For example, the VTOL landing system operation may be facilitated using three primary onboard sensors, such as (1) a pulse radar with range and relative bearing measurement mode, (2) a downward-oriented eye-safe near-IR flash LIDAR, and (3) a multi-beam Doppler radar ground speed sensor. However, functional equivalents to the three onboard sensors may be readily integrated or substituted, for example, continuous wave radar in place of the first sensor, a visible light camera with downward facing pulse-Doppler radar for the second sensor, and inertial navigation for the third sensor. Accordingly, the VTOL landing system does not require the installation of special equipment on the vessel. The VTOL system may also utilize the existing UAV sensors: radar altimeter, attitude and heading reference system (AHRS), and barometric altimeter. The selected sensors are preferably robust in order to function in fog, rain, snow, and wet deck and can operate in total darkness. Examples of such sensors, which may be fixedly mounted on the aircraft, are discussed in greater detail below.

Pulse Radar.

A pulse radar sensor measures range and bearing to radar reflective objects such as the hull of a vessel. Although a pulse radar sensor unit typically has 360° visibility, only the forward quadrant may be required in the VTOL application. For this reason, only the forward quadrant needs to be unobstructed on the aircraft. This allows for greater installation flexibility. An example pulse radar sensor suitable for VTOL application may meet the following performance parameters: Range bias 10 ft 3σ, noise 20 ft 3σ; Heading bias 1 deg 3, noise 3 deg 3σ; Heading bias 3 deg 3σ, noise 9 deg 3σ at 70 ft range.

Flash LIDAR.

A flash LIDAR sensor collects an actively illuminated near-IR image with precise range measurements at each pixel, so that it may be capable of detecting both the paint markings on the deck and the shape and orientation of the deck. As an active sensor, it performs well in all lighting conditions including total darkness. The near-IR frequency easily penetrates wet deck, fog, rain, and snow at 80 ft distance. Flash LIDAR may record measurements for the entire field of view simultaneously. This enables use of the flash LIDAR in applications involving a moving target and a moving camera in the absence of GPS. In contrast, scanning LIDAR collects data sequentially across the field of view. Scanning LIDAR relies on precise knowledge of the location of the camera (such as through GPS or another source) in order to assemble the sequentially gathered measurements into an image. This can result in imaging errors if precise camera location information may be unavailable and if the target is in motion.

Doppler Velocity Sensor.

A Doppler velocity sensor measures ground-relative velocity in all three dimensions and is a radar-based sensor that may be used on VTOL aircraft requiring precise hover and navigation in GPS-denied environments. The Doppler velocity sensor consists of four continuous-wave Doppler radar beams may be used to compute ground-relative velocity in three dimensions based on the differential measurements across the four beams. In VTOL operation, the Doppler velocity sensor may be used to measure velocity during over-water flight as well as vertical and horizontal velocity relative to the deck during over-deck flight.

Attitude and Heading Reference System (AHRS).

An AHRS computes an "artificial horizon", which corresponds to the local roll and pitch angle of the aircraft, and the heading, which corresponds to the yaw of the aircraft. The AHRS may comprise, for example, magnetometers, gyros, and accelerometers. AHRS can operate with or without GPS aide.

Radar Altimeter (RADALT).

A radar altimeter measures altitude above the terrain beneath an aircraft.

Barometric Altimeter.

A Barometric Altimeter measures air pressure and correlates it to a specific altitude. At high altitudes, air pressure decreases; at low altitudes, air pressure increases. A barometric altimeter measures the air pressure and translates that reading into a measurement of altitude.

To provide an overview, the present invention may be illustrated by the following Examples. These Examples are provided to aid in the understanding of the invention and are not to be construed as a limitation thereof.

Example 1

An example landing sequence 100 is illustrated in FIG. 1. The landing operation 100 starts at the initialization point 102 with the aircraft 116 in flight at an altitude C (e.g., 300 to 1000 feet, more preferably 400-700 ft, even more preferably 500 ft) and a distance A (e.g., 1 to 1.5 nautical miles) within 45° of the stern of the vessel 114. Using one or more sensors, the aircraft 116 may determine, or receive, the vessel 114 range and vessel 114 bearing relative to the aircraft 116. The aircraft 116 may approach the vessel 114 at a predetermined closing speed (e.g., 40 knots with a glide angle of about 3°). Using a computer-implemented algorithm coupled with one or more onboard sensors, the aircraft 116 can determine the aircraft groundspeed and aircraft position in a local coordinate frame. Similarly, the aircraft 116 may determine vessel position and vessel velocity in the local coordinate frame from the vessel range, vessel bearing, aircraft groundspeed, and aircraft position determinations. Vessel range and bearing may be calculated using a radar sensor. Examples of such radar sensors include, for example, a pulse radar, pulse Doppler radar, high-range resolution radar, pulse-compression radar, synthetic aperture radar, inverse synthetic aperture radar, imaging radar, tracking radar, track-while-scan radar, 3-D radar, phased-array radar, continuous-wave radar, frequency-modulated continuous-wave radar, or any combination thereof. The aircraft may identify a VRODW location at a fixed distance from the vessel along, for instance, a negative vessel velocity vector.

The aircraft 116 may hold at a VRODW (e.g., perch point 104) during Perch Phase 124, which may be located distance B (e.g., 50 to 500 feet, more preferably 50-200 ft, even more preferably 100 ft) aft of the touchdown point 110 and distance D (e.g., 20-100 ft, or more preferably 30 ft) above the vessel 114's deck. In operation, the aircraft 116 may hold in the Perch Phase 124 for a predetermined period of time (e.g., 5 to 60 seconds, more preferably 5 to 30 seconds, even more preferably 10 seconds) until the aircraft 116 receives a "land" command from the vessel 114 through, for example, a C2 communication link. The aircraft 116 may advance from the perch point 104 to the high hover point 106, which may be above the touchdown point 110. At the high hover point 106, the aircraft 116 may wait a predetermined period of time (e.g., 5 to 60 seconds, more preferably 5 to 30 seconds, even more preferably 10 seconds) prior to descending to the low hover point 108, which may be about midway between the high hover point 106 and the touchdown point 110. Once at the low hover point 108, the aircraft 116 may again wait for a predetermined period of time (e.g., 5 to 60 seconds, more preferably 5 to 30 seconds, even more preferably 10 seconds) before descending to the touchdown point 110. The descent speed between the high hover point 106 and the low hover point 108 ("Intermediate Descent"), and the low hover point 108 and the touchdown point 110 ("Final Descent") may be at a nominal closing rate (e.g., 2.5 ft/s). In essence, the landing operation 100 comprises two primary types of tasks: (1) locate the stations (102, 104, 106, 108) relative to the vessel within the required accuracy and (2) guide the vehicle to the stations within the specified trajectory constraints (e.g., touchdown contact velocity).

Example 2

Figure 2:
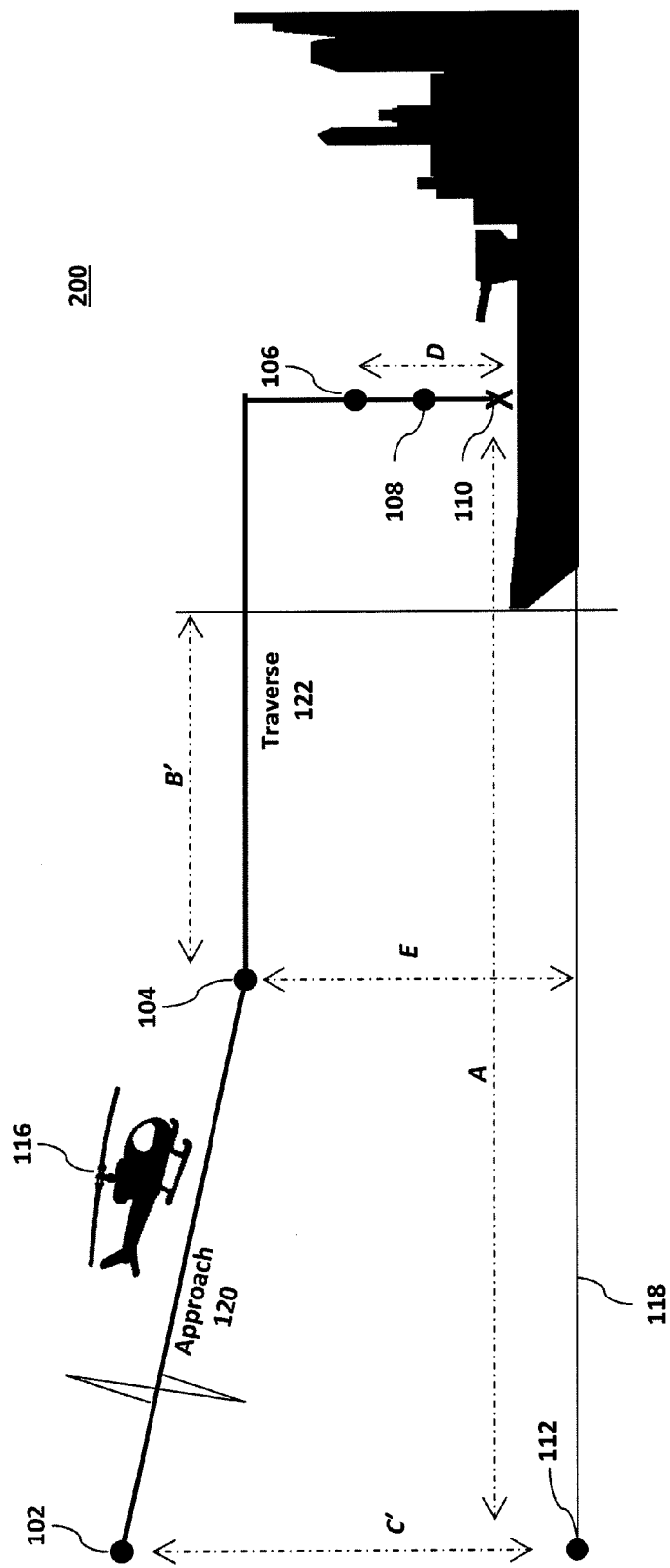
FIG. 2 illustrates a second example landing sequence.

Another technique in providing a VTOL landing system that can operate on a variety of vessels without knowledge of vessel type includes the generalization of the initialization point 102 and Perch Point 104 in the landing sequence into locations that are independent of vessel geometry. FIG. 2 illustrates a modified landing sequence 200, which is similar to that shown in FIG. 1, but with a change in the specification of the initialization point 102 and Perch Point location 104. While the baseline Perch Point 104 was previously specified to be distance D above the deck in landing sequence 100, such an approach may be vessel-dependent since the deck height can vary from vessel to vessel. Therefore, a generalized Perch Point 104 of landing sequence 200 may be specified to be distance E (e.g., 70 ft) above sea level 118. This eliminates dependency on deck height while ensuring that the Perch Point 104 will be sufficiently high above the deck of a given vessel 114. For example, while accounting for the 6 ft uncertainty in the radar altimeter, the aircraft 116 will still be at least distance D above the deck of FFG-7, DDG-51, LPD-13, LSD-36, AE-27, or AO-178 vessels when distance E is set to 70 feet.

Likewise, whereas the baseline Perch Point 104 of landing sequence 100 was specified to be located distance B (e.g., 100 ft) aft of the touchdown point 110, the generalized Perch Point 104 may be specified to be distance B' (e.g., 70 ft) aft of the stern of the vessel 114. This eliminates dependency on the location of the touchdown point 110 relative to the stern of the vessel 114 while ensuring that the Perch Point 204 will be at least distance B' aft of the touchdown point 110 of an FFG-7, DDG-51, LPD-13, LSD-36, AE-27, or AO-178 vessel. Note that the high hover point 106 may remain unaltered at distance D above the deck. As with landing sequence 100, at the end of traverse, the aircraft 116 descends to the high hover point 106. The result is a single common landing sequence that can safely land the aircraft 116 on all the vessel 114 variants.

Regardless of the landing sequence 100, 200, as will be discussed in greater below, a pulse radar 302, RADALT 524 and Doppler velocity sensor 304 may be employed during the Approach Phase 120 and perch 124 phases. In addition to the Approach Phase 120 and perch point 124 phases, the Doppler velocity sensor 304 may be used during the Intermediate Descent and the Final Descent. An AHRS 306 and/or Barometric Altimeter 530 may be used during Traverse 122; high hover 106; and Low Hover 108. The AHRS 306 may also be employed during Intermediate Descent and/or Final Descent. Finally, the flash LIDAR 532 may be employed during High Hover 106, Low Hover 108, Intermediate Descent and/or Final Descent.

Approach Phase 120 and Perch Phase 124.

Figure 3:
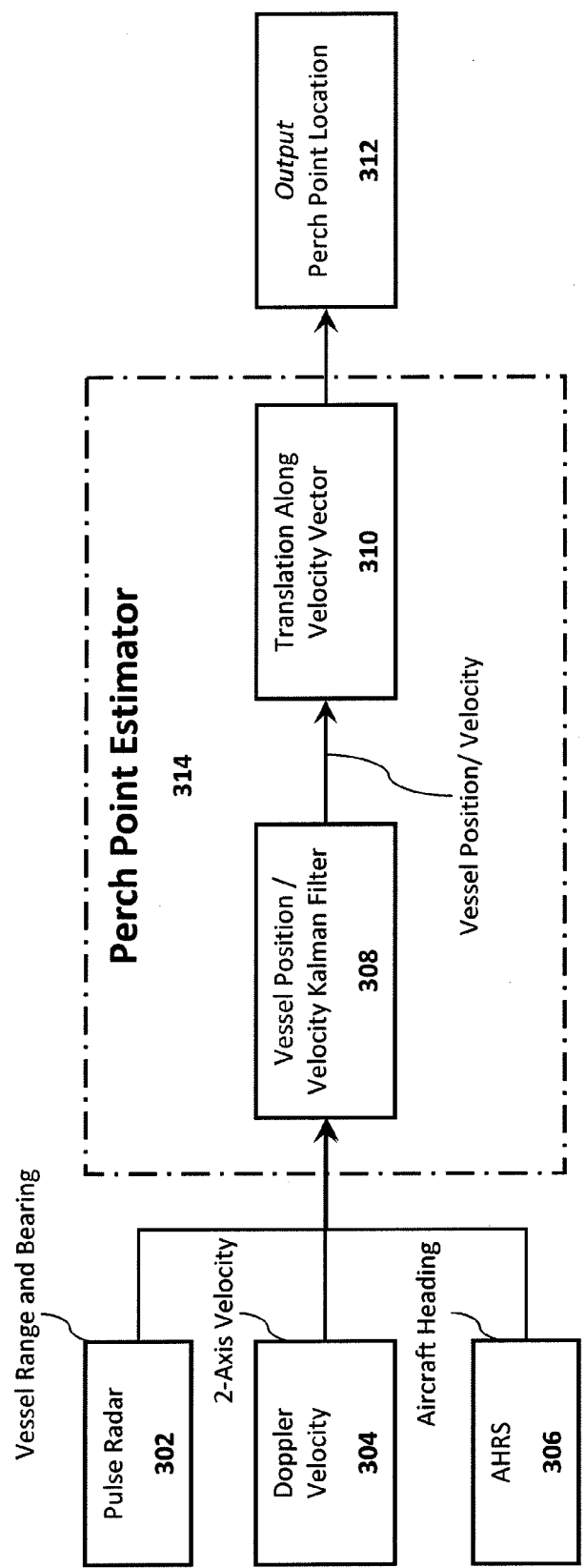
FIG. 3 illustrates an example perch point estimator.

As discussed in Examples 1 and 2, the first two phases of the VTOL landing operation generally comprise the approach to the perch point 104 (Approach Phase 120) and the hold at perch point 104 (Perch Phase 124). Both phases may use the system illustrated in FIG. 3. While the intuitive approach to locating the perch point 104 relative to a vessel 114 may be to use computer vision to interpret the vessel geometry and orientation based on imaging sensors, this application can be overly complex and tends to be error prone and sensitive to variations in vessel geometry. Rather, a VTOL system may estimate the Perch Point Location 312 based on estimated parameters vessel location and vessel velocity. For example, a Kalman filter 308 may be used to estimate vessel location and velocity along a velocity vector 310 based on estimated parameters. The Kalman filter 308 may include, for example, a Kalman filter, extended Kalman filter, unscented Kalman filter, particle filter, least-squares estimator, recursive estimation algorithm, or any combination thereof.

Figure 4A:
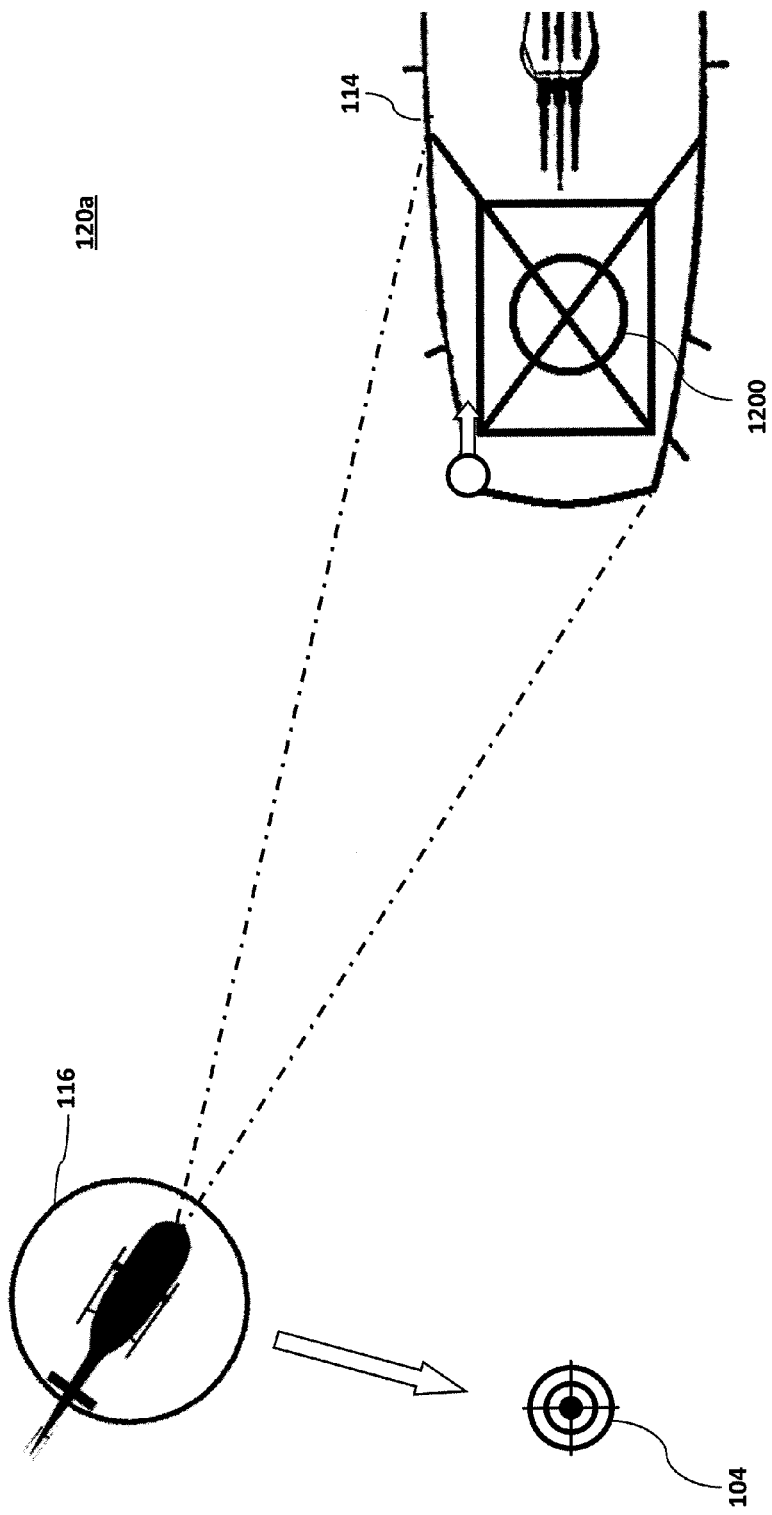
FIGS. 4a-4c illustrate an example diagram of perch point estimate convergence.
Figure 4B:
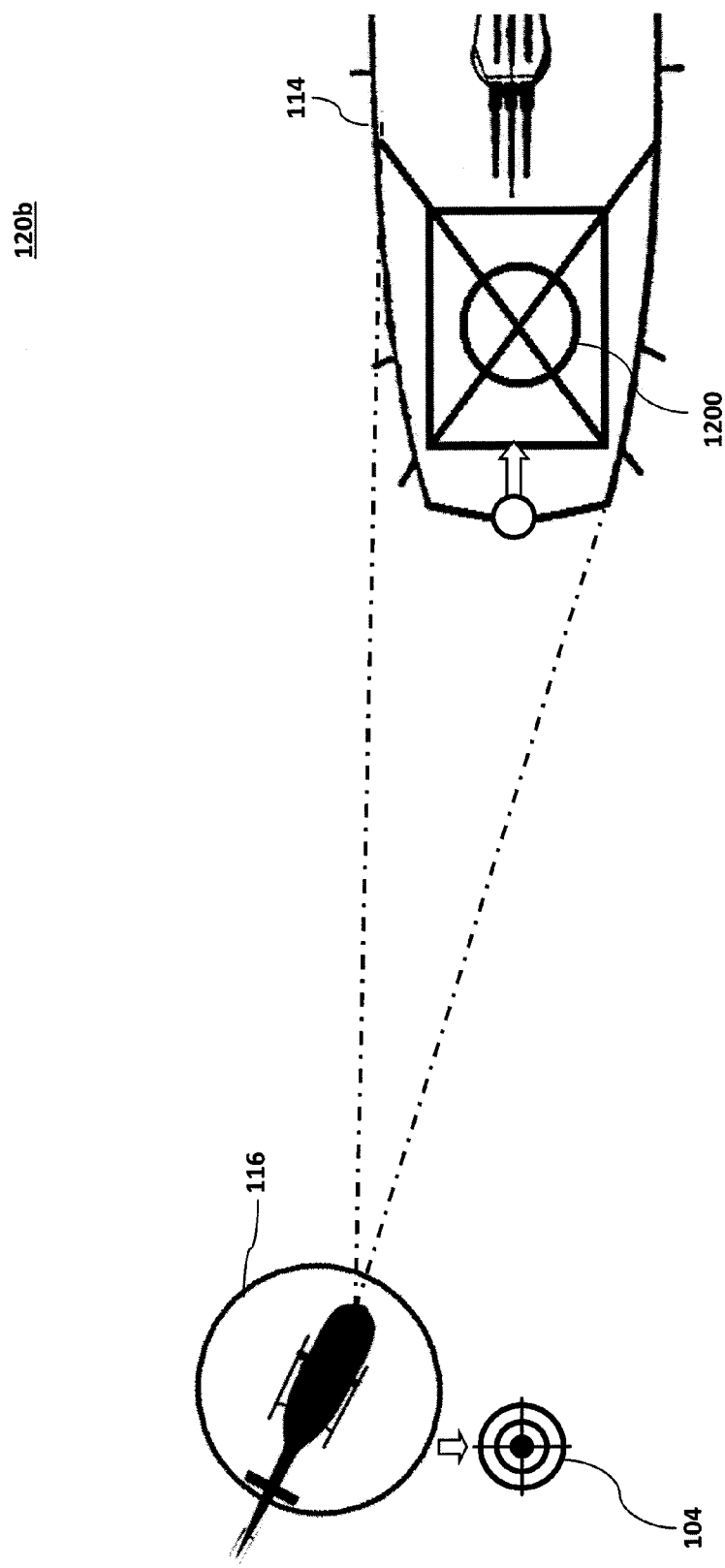
Figure 4C:
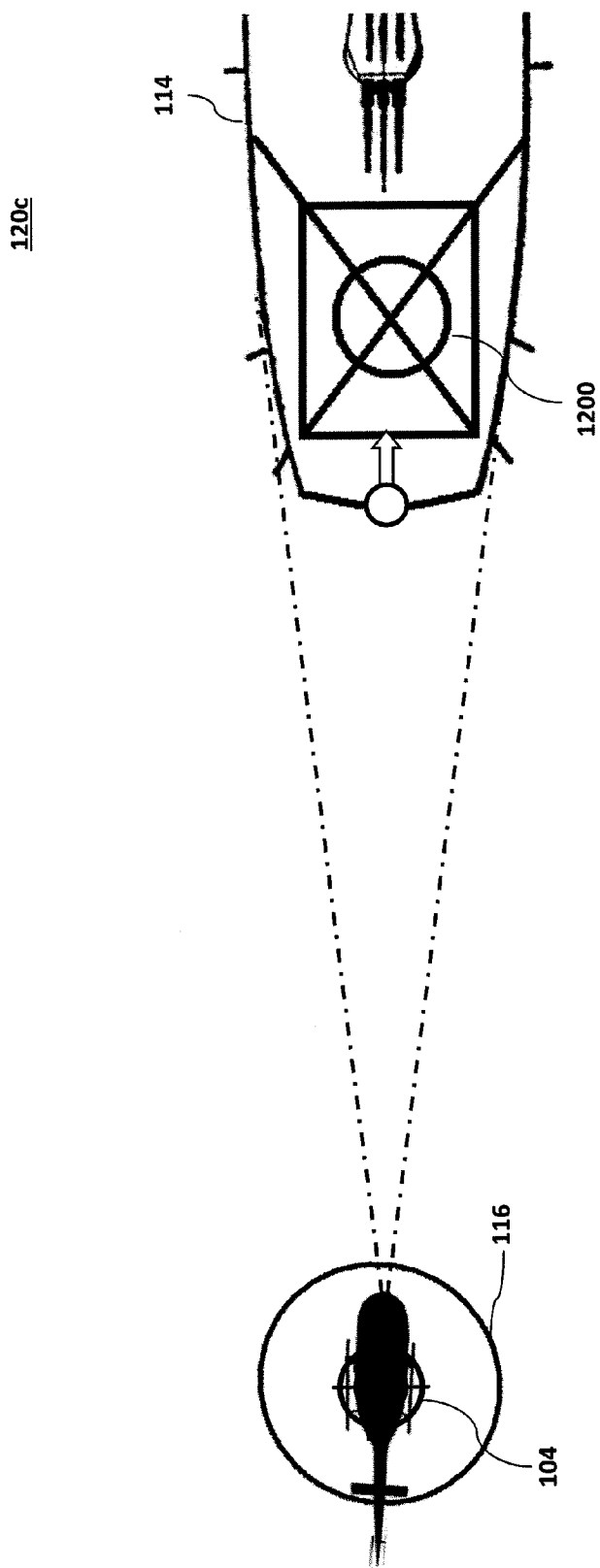

Such estimated parameters may include the Pulse Radar range 302, bearing measurements 306 and the Doppler Velocity measurements 304. Using these inputs, a Perch Point Location 312 may be computed as a fixed distance aft of the vessel 116 along the vessel velocity vector. FIGS. 4a through 4c illustrate how the perch point estimator 314 may converge to the true perch point location 104 even with a low angular resolution sensor. In essence, a goal of the Approach Phase 120 is to steer the aircraft 116 from an initialization point 102 to the perch point 104.

Figure 5:
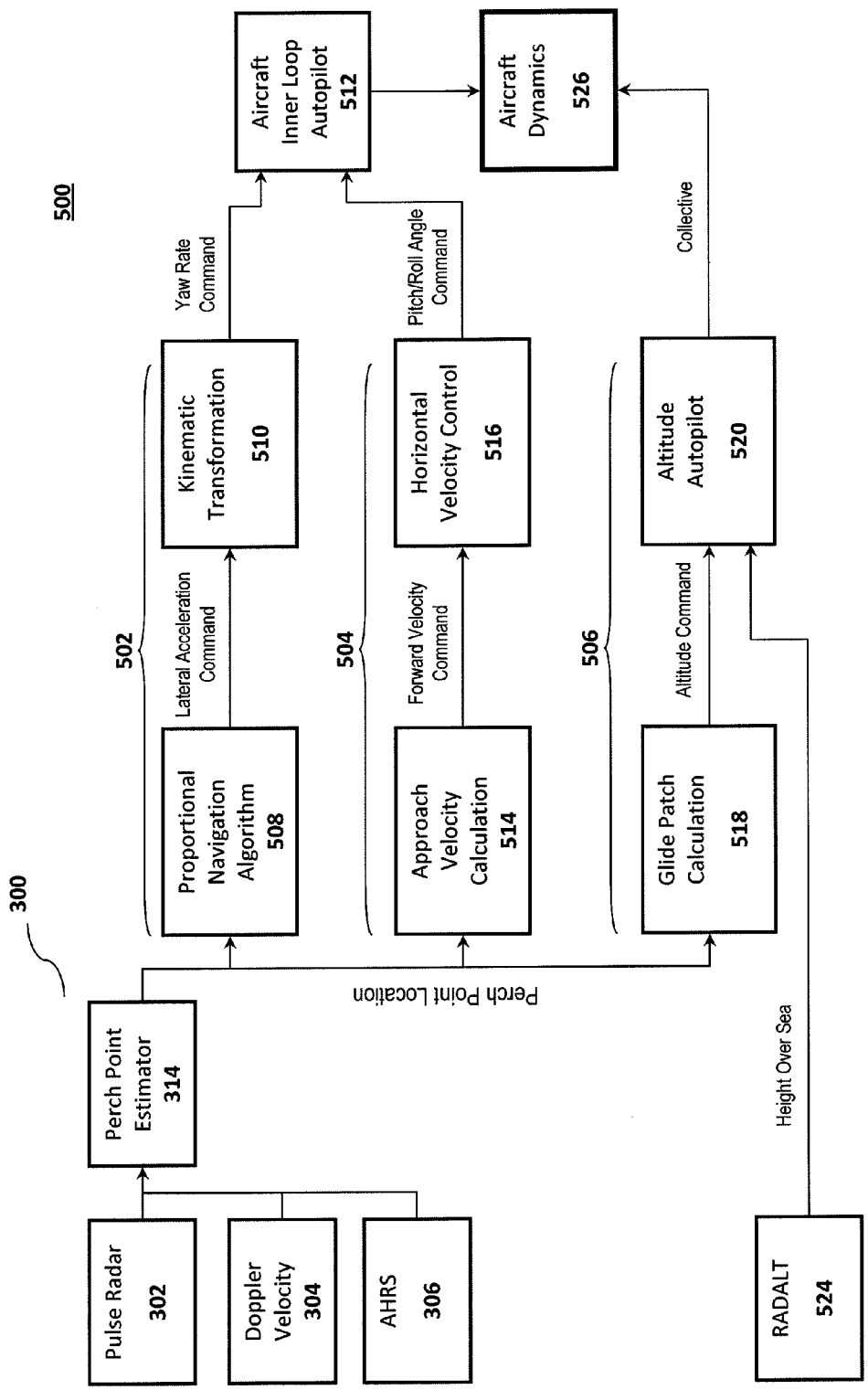
FIG. 5 illustrates an example block diagram of an approach guidance system.

FIG. 5 illustrates a block diagram of the Approach Guidance system 500. The Approach Guidance system 500 comprises three general components: Lateral Guidance 502, Forward Velocity Guidance 504, and Altitude Guidance 506. The Lateral Guidance 502 may use a Proportional Navigation Algorithm 508 to compute the lateral acceleration required to steer the aircraft to intercept the perch point in motion. Yaw Rate Commands may be computed based on the Lateral Acceleration Command and the aircraft speed calculated using Kinematic Transformation 510. The Yaw Rate Commands may be input to the Aircraft Inner Loop Autopilot 512, which may be coupled with the Aircraft Dynamics 526. Aircraft Dynamics 526 may be, for instance, a flight control system configured to control the aircraft's pitch, roll, or yaw. For example, in a rotorcraft aircraft, the Aircraft Dynamics 526 may be configured to control the aircraft's pitch, roll, or yaw using received lateral cyclic, longitudinal cyclic, tail rotor commands.

Figure 7:
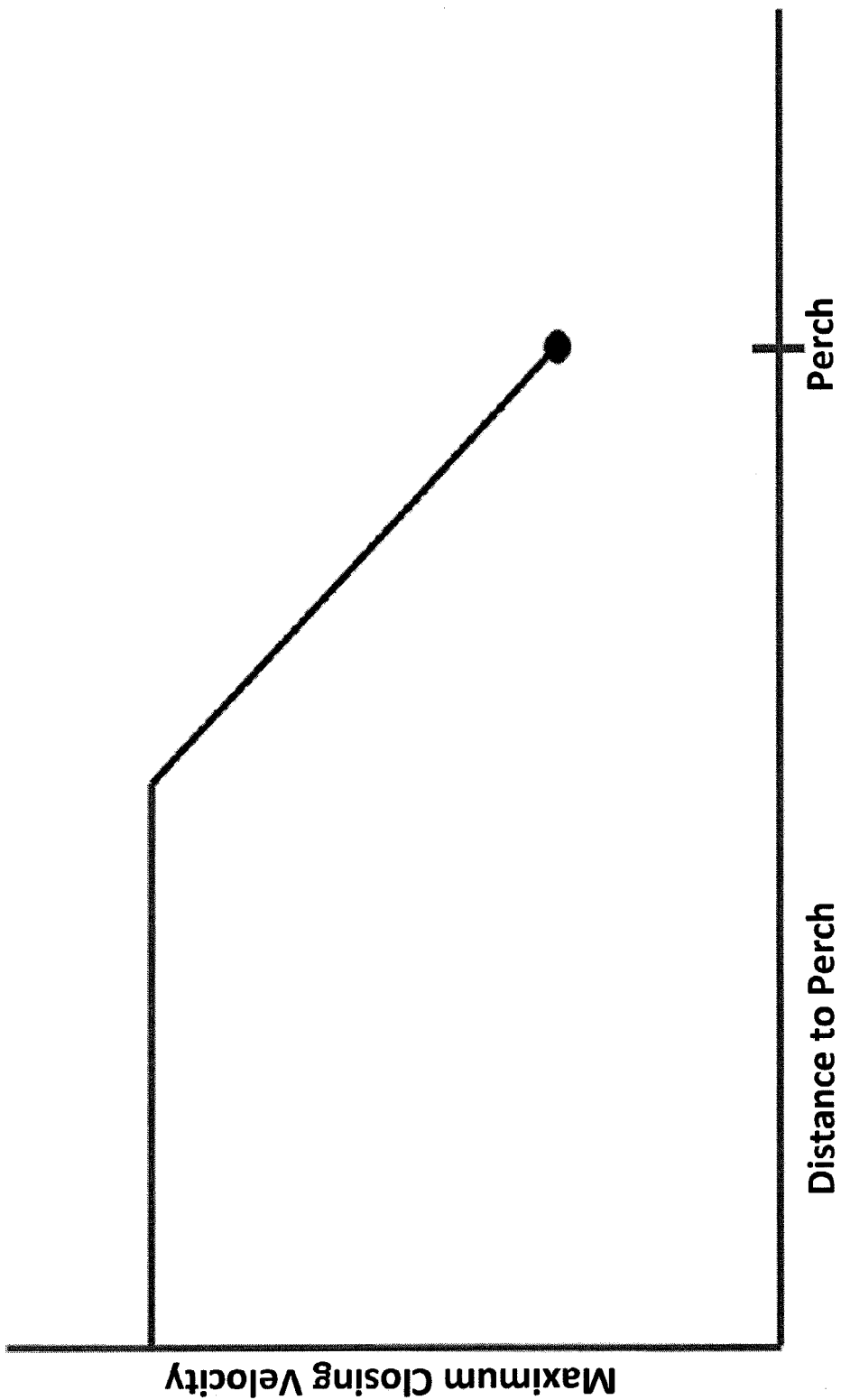
FIG. 7 illustrates an example graph of a closing rate command.

Forward Velocity Guidance 504 may be determined using trajectory shaping Approach Velocity Calculations 514, which may use the velocity profile shown in FIG. 7, and Horizontal Velocity Control 516. The resulting pitch and roll command may be input to the Aircraft Inner Loop Autopilot 512. Similarly, Altitude Guidance 506 may be facilitated using trajectory-shaping Glide Path calculations 518, which may use the altitude profile shown in FIG. 8, and measurements from the RADALT 524. The resulting altitude command and altitude feedback measurement may be communicated to the Altitude Autopilot 520.

To verify accuracy, the Perch Point Estimator 314 with vessel position and velocity Kalman filter was implemented in a closed-loop nonlinear 6 Degree of Freedom ("6DOF") simulation. The perch point estimation error was predicted by covariance analysis based on the manufacturer-supplied sensor specifications and summarized in Table A. As illustrated, the calculated error values are suitable for the landing application.

TABLE A

| Phase | Performance Metric | Value |
| --- | --- | --- |
| Perch Point 104 | Longitudinal Error | 10.0 ft 3σ |
|  | Lateral Error | 3.7 ft 3σ |

Figure 6:
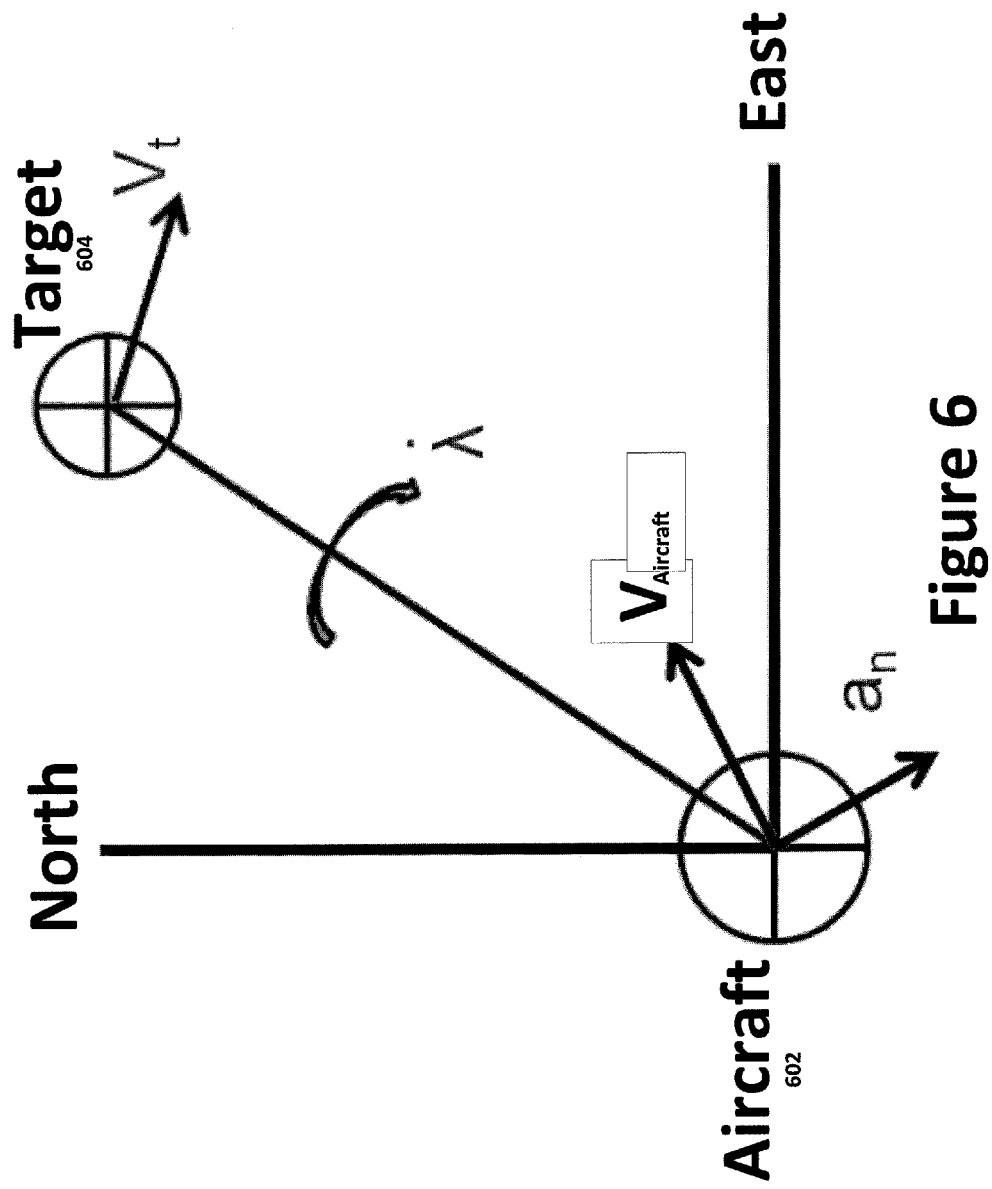
FIG. 6 illustrates an example diagram of proportional navigation.

As illustrated in FIG. 6, the Proportional Navigation Algorithm 508 may be used to steer a vehicle 602 to a moving target 604 (e.g., a vessel) by zeroing out the line-of-sight rate to the target. The algorithm implicitly takes into account the estimated velocity of the vessel 604. The Forward Velocity Guidance 504 may be used to command the maximum closing rate to the vessel 604. The forward velocity command may be computed based on the desired closing rate and the estimated vessel velocity. For example, as illustrated in FIG. 7, the maximum closing rate may be ramped down as the aircraft nears the vessel for a smooth transition to Perch Phase 124.

Figure 8:
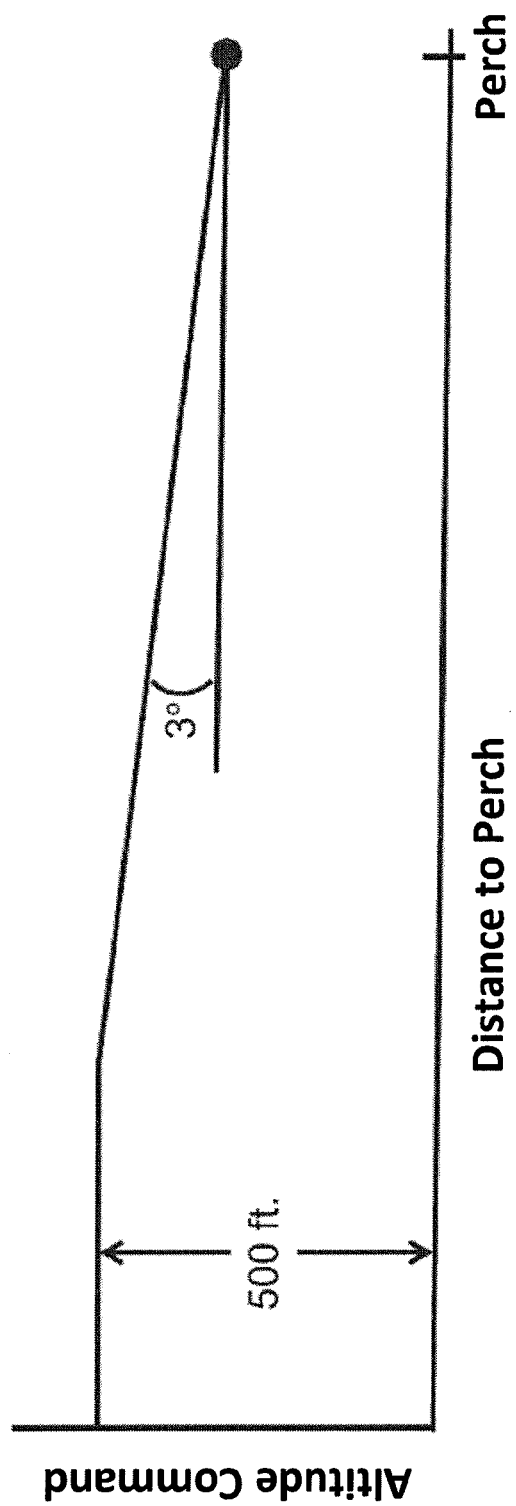
FIG. 8 illustrates an example graph of an altitude command.

As illustrated in FIG. 8, Altitude Guidance 506 may be used to command the vehicle to follow the glide path that intercepts the perch point at the desired glide slope. The altitude command may be computed based on the distance to the estimated perch point 104. For example, the trajectory may be constrained by a maximum altitude command at 500 ft and a maximum vertical velocity limit of 5 ft/s. The altitude may be measured using, for example, the RADALT 524 during the Approach Phase 120. Using an Average Sea State 4 ship motion profile, a 6DOF simulation was executed total tracking performance. Table B summarizes the total tracking performance (estimation and control) at the various phases in the landing operation.

TABLE B

| Phase | Performance Metric | Bias | Oscillation |
| --- | --- | --- | --- |
| Perch Point 104 | Longitudinal Error | 10.0 ft 3σ | 1.5 ft 3σ; 1.5 ft peak |
|  | Lateral Error | 3.7 ft 3σ | 1.1 ft 3σ; 1.1 ft peak |
|  | Altitude Error | 6.0 ft 3σ | 0.3 ft 3σ; 0.3 ft peak |

Figure 9:
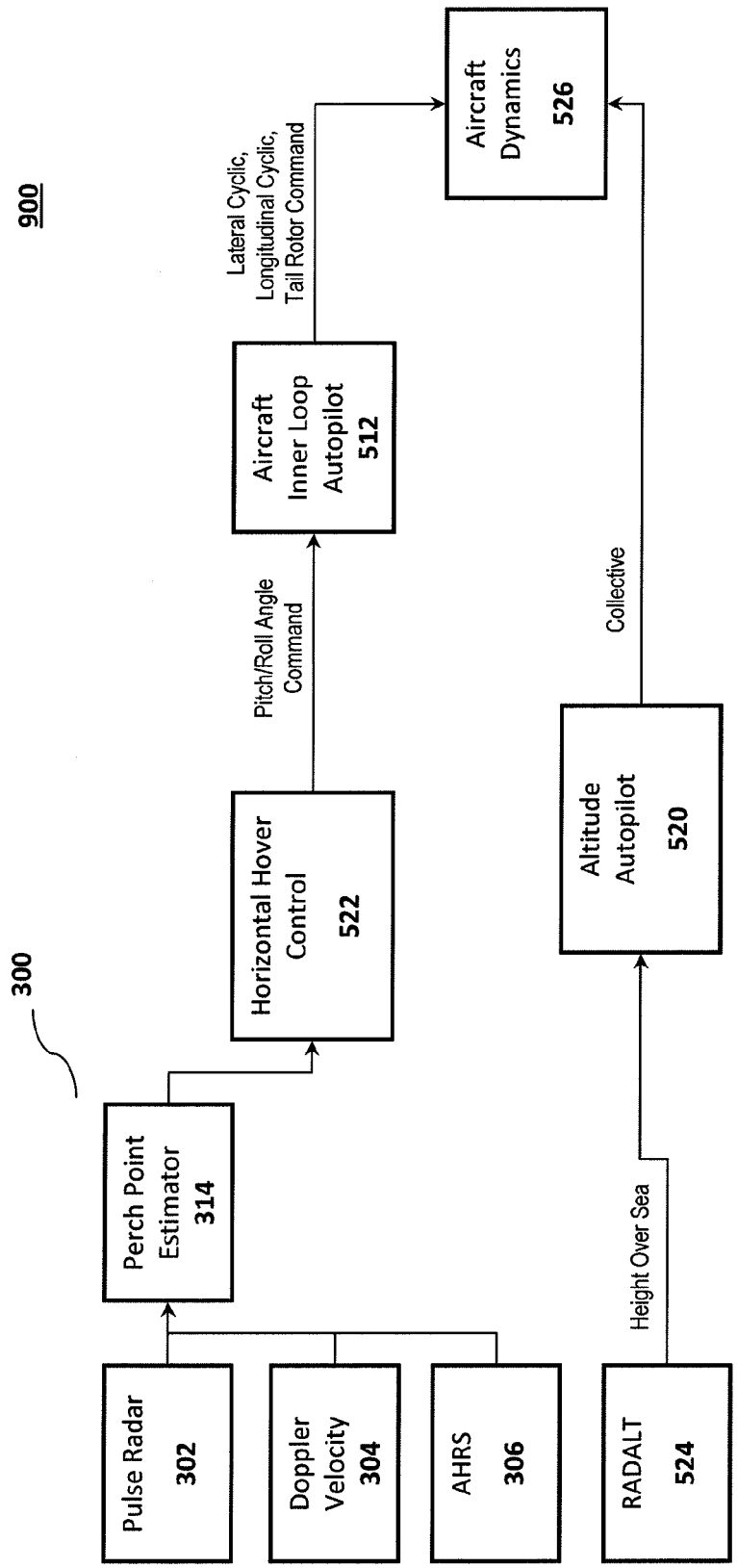
FIG. 9 illustrates an example block diagram of a perch guidance system.

The landing sequence may be switched to the Perch Phase 124 when the aircraft may be within a predetermined distance of the estimated perch point 104. Perch Guidance can hold the aircraft at the perch location for a predetermined amount of time and until the aircraft receives the command to land through, for example, the C2 communication link. As illustrated in FIG. 9, a Perch Guidance system 900 may comprise, for example, Horizontal Hover Control 522 and an Altitude Autopilot 520. Horizontal Hover Control 522 provides a feedback loop that drives the estimated aircraft position to the estimated perch position. The Perch Point Estimator 314's Kalman filter 308 estimates the vessel location, but also propagates the aircraft position based on Doppler velocity 304 measurements. Because the vessel location and aircraft location may be estimated using the same Doppler velocity 304 measurements, perch point error contribution from propagation drift is eliminated. The Altitude Autopilot 520 is a feedback loop that drives the measured altitude to the preset perch altitude. The altitude may be measured using the RADALT 524 in the Perch Phase 124.

Traverse Phase 122.

The aircraft may remain in the Perch Phase 124 until a command to land signal may be communicated (e.g., through a C2 communication link), at which point it switches to the Traverse Phase 122. An objective of the Traverse Phase 122 is to steer the vehicle from the perch point 104 to the high hover point 106.

The transition from over-sea to over-deck flight can cause the RADALT 524 and Doppler velocity 304 sensor to produce unreliable measurements. For this reason, the RADALT 524 and Doppler velocity 304 sensor need not be used in the Traverse Phase 122. Rather, during the Traverse Phase 122, horizontal guidance may be based on inertial navigation while vertical control may be based on barometric altimeter 530 measurements.

Figure 10:
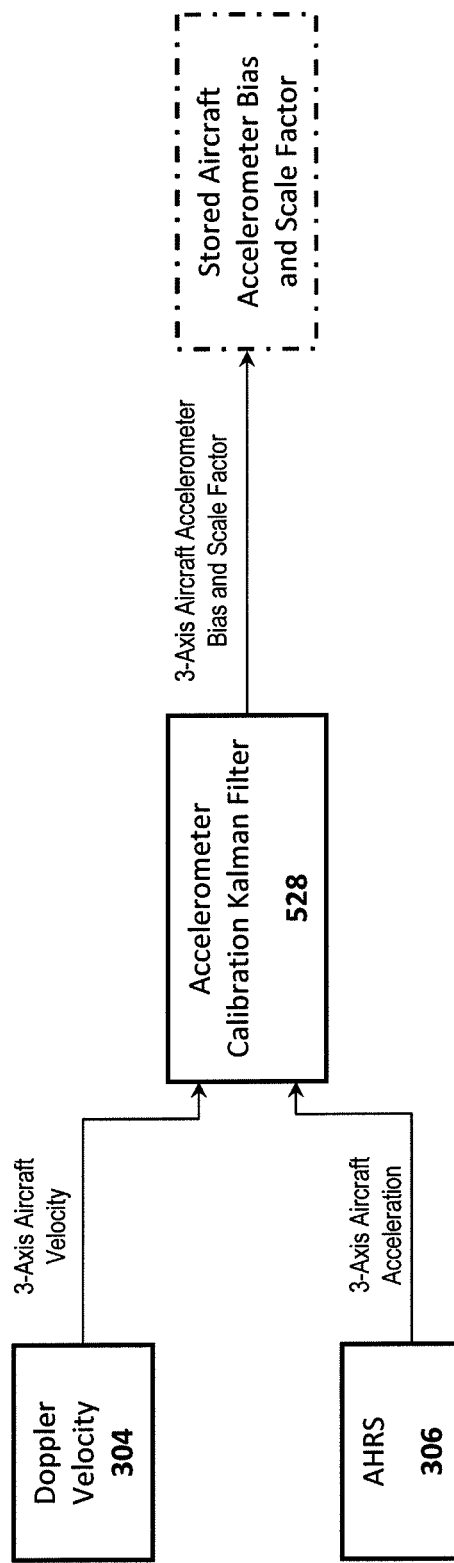
FIG. 10 illustrates an example block diagram of an accelerometer calibration system.

Since accelerometer bias can cause position error to grow rapidly in an inertial navigation system, as illustrated in FIG. 10, the accelerometer bias may be calibrated using a Kalman filter 528 during the Approach Phase 120 and the Perch Phase 124. The accelerometer scale factor does not contribute significant error in Traverse Phase 122 because of the low acceleration. The residual accelerometer bias at the end of calibration may be computed by covariance analysis based on the closed-loop Approach and Perch trajectories from the 6DOF simulation. Simulation and covariance analysis shows that the accelerometer bias at the end of calibration may be reduced to 0.008 ft/s2 3σ. Also in preparation for Traverse 122, the barometric altimeter 530 may be calibrated based on filtered RADALT 524 output during the Perch Phase 124. Since the RADALT 524 is not needed for the landing sequence, it may be shut down at the beginning of Traverse Phase 122. However, the Doppler velocity 304 sensor can remain powered on for use in later phases, but it is not needed in the Traverse Phase 122. The flash LIDAR 532 may be powered on at the beginning of Traverse Phase 122, and image processing commences to detect the landing circle 1200 when it eventually enters the field of view. The error contributions based on Kalman filter covariance analysis and sensor specifications are combined to compute the total navigation error at the end of the Traverse Phase 122. The error contributions based on Kalman filter covariance analysis and sensor specifications are combined to compute the total navigation error at the end of the Traverse Phase (Table C). As illustrated, the calculated error values are suitable for the landing operation.

TABLE C

| Direction | Error Source | Value |
| --- | --- | --- |
| Lateral | Residual accelerometer bias | 1.7 ft 3σ |
|  | Vessel velocity vector estimate error | 3.6 ft 3σ |
|  | Perch point estimate error | 3.7 ft 3σ |
|  | Total lateral error | 5.4 ft 3σ |

TABLE C-continued

| Direction | Error Source | Value |
|---|---|---|
| Vertical | Barometer drift | 0.5 ft 3σ |
| | Radar altimeter initialization error | 6.0 ft 3σ |
| | Total vertical error | 6.0 ft 3σ |

Figure 11:
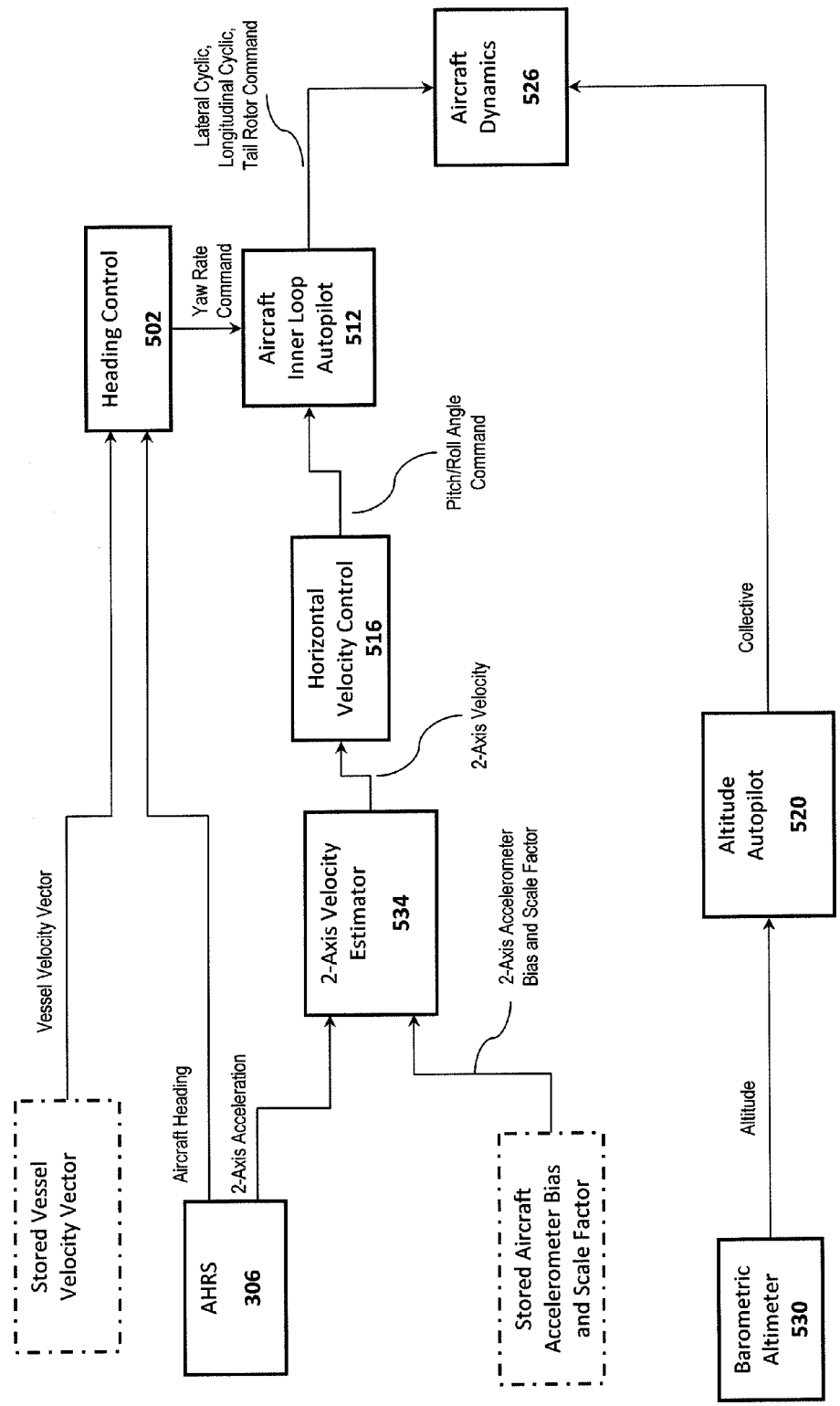
FIG. 11 illustrates an example block diagram of a traverse guidance system.

Based on propagated accelerometer information, an aircraft 116 may be guided to advance at a 10 ft/s closing rate along the estimated vessel velocity vector. Based on, for example, the Barometric Altimeter 530, the aircraft may be commanded to maintain the perch altitude until the end of Traverse Phase 122. Traverse Phase 122 ends when the downward-facing flash LIDAR 532 detects the landing circle 1200. An example Traverse Guidance block diagram is provided in FIG. 11. A lateral and longitudinal 2-Axis Velocity Estimator 534 may provide feedback to the Horizontal Velocity Control 516, which may regulate forward and lateral velocity by computing pitch and roll commands that drive the Aircraft Inner Loop Autopilot 512. The heading of the aircraft may be aligned with the estimated ship velocity vector by the Heading Control 502, which computes yaw rate commands that drive the Aircraft Inner Loop Autopilot 512. The Altitude Autopilot 520 may maintain the perch altitude using, for example, the Barometric Altimeter 530. The calculated total estimation and control error provided in Table D at the end of Traverse Phase 122 combines the navigation error from Table C with closed-loop control error evaluated by 6DOF simulation.

TABLE D

| Phase | Performance Metric | Bias | Oscillation |
|---|---|---|---|
| End of Traverse | Lateral Error | 5.4 ft 3σ | 0.3 ft 3σ; 0.3 ft peak |
| | Altitude Error | 6.0 ft 3σ | 0.3 ft 3σ; 0.3 ft peak |

Landing Circle Detection and Touchdown Marker Identification.

Figure 12:
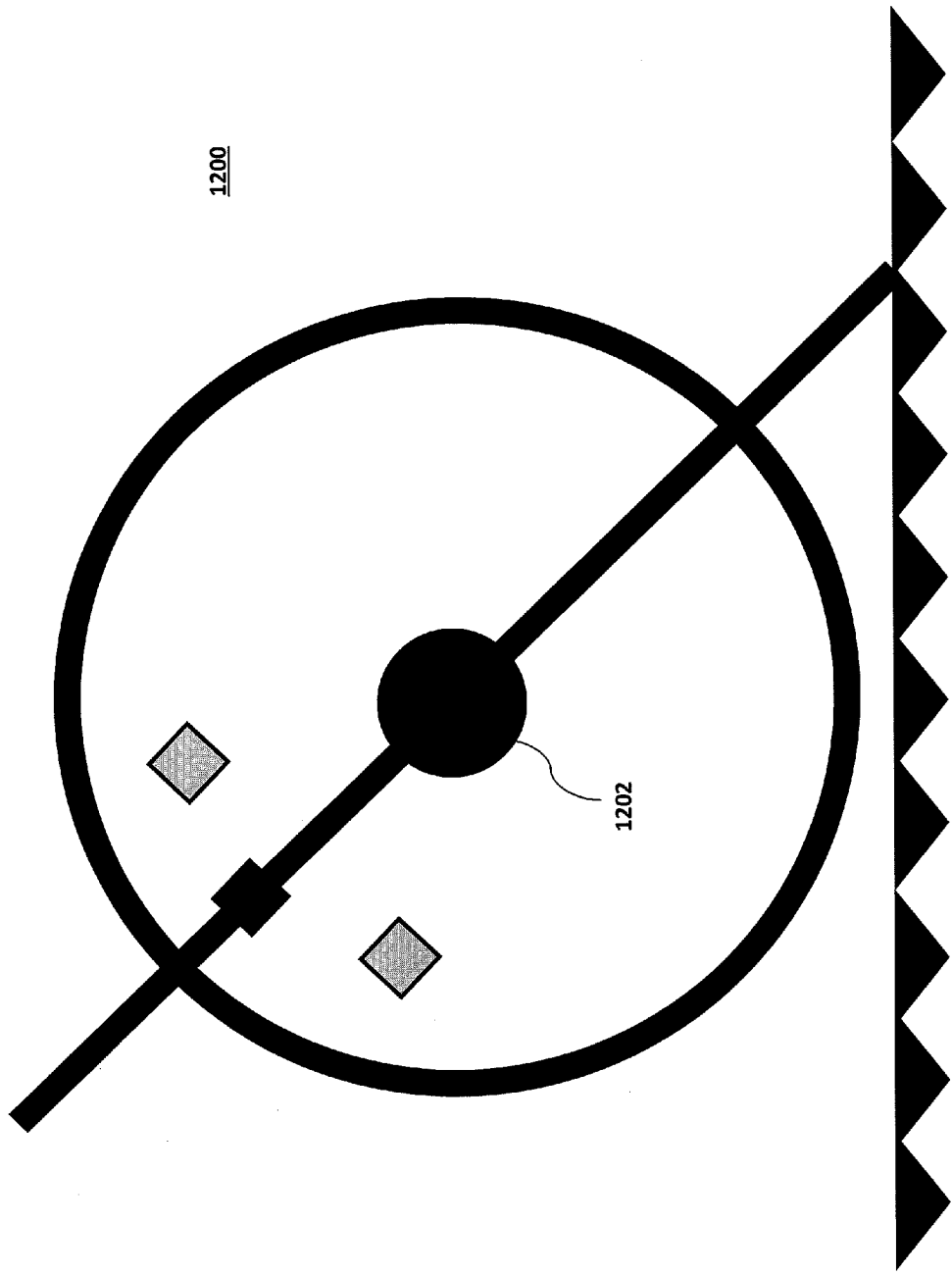
FIG. 12 illustrates an example overhead view over a deck.

During the Traverse Phase 122, flash LIDAR 532 data may be processed to detect a landing circle 1200. An example image with the appropriate 45° field-of-view at about 40 ft above the deck is shown in FIG. 12. The algorithm to detect a landing circle 1200 in an image may be accomplished using a Hough transform, a feature extraction technique used in image analysis, computer vision, and digital image processing. The reliability of detection may be significantly increased by the fact that the expected size of the landing circle within the image is often known, since the flash LIDAR 532 also has range information to the deck. This additional information can enable the system to detect a landing circle 1200 even when it is only partially in view. Once a landing circle 1200 is detected, another Hough transform search may be performed to detect a smaller circle 1202 (which are often approximately 4 ft diameter) at the center of the landing circle 1200. The smaller circle 1202 may be used to identify the touchdown point 110. The smaller circle 1202 fits within the field-of-view down to about 5 ft above the deck. If a smaller circle 1202 at the center of the landing circle 1200 is not standard on all vessels, the algorithm may be extended to automatically detect a cross or a square if that is the marking in place of a circle in the middle of the landing circle.

The guidance algorithms for the final four phases are summarized in Table E. The subsequent sections describe the algorithms in detail.

TABLE E

| Mode | Horizontal | Vertical |
|---|---|---|
| High Hover 106 | Track TD point 110 | Coarse hold height over deck |
| Intermediate Descent | Track TD point 110 | Coarse hold closing rate |
| Low Hover 108 | Track TD point 110 | Fine hold height over deck |
| Final Descent | Track TD point 110 | Fine hold closing rate |

The final four phases share the same, or similar, horizontal guidance algorithm, which may be designed to horizontally align the aircraft with the estimated touchdown point 110. The touchdown point 110 may be estimated using a Kalman filter that fuses relative location information based on detected deck markings and relative horizontal velocity information. The combined use of relative position and relative velocity information enables the estimator to provide continuous estimates of touchdown point location even when the deck marking moves out of the field of view, which will inevitably occur below 5 ft above the deck and may occur intermittently throughout the terminal phases.

Relative velocity information may be based on Doppler velocity sensor 304 measurements when operating near the deck (e.g., 15 ft above the deck). However, when operating high above the deck (e.g., more than 15 ft), the Doppler velocity sensor 304 beam pattern can extend beyond the boundaries of the deck resulting in erroneous Doppler velocity sensor 304 readings. For this reason, relative velocity may be measured using optic flow processing of the flash LIDAR 532 data when operating high above the deck. Optic flow refers to the distribution of movement of landmarks across the focal plane. A landmark may be any feature on the image that can be correlated from one frame to the next. The relative velocity of the touchdown point can be computed from the optic flow data extracted from the flash LIDAR 532 images combined with the information on the range and relative orientation of the deck also provided by the flash LIDAR 532 sensor.

The touchdown point estimation accuracy is summarized in Table F. The larger error at higher altitudes may be driven by increased sensitivity to angle error and the lower accuracy of optic flow velocity measurements in contrast to Doppler velocity sensor 304 measurements. The optic flow velocity measurements are assigned a conservative noise value of 3 ft/s 3σ, in the absence of experimental data at this time.

TABLE F

| Phase | Performance Metric | Bias | Oscillation |
|---|---|---|---|
| 30 ft | Longitudinal Error | 0.6 ft 3σ | 0.6 ft 3σ; 0.8 ft peak |
| | Lateral Error | 0.6 ft 3σ | 0.7 ft 3σ; 0.8 ft peak |
| 15 ft | Longitudinal Error | 0.3 ft 3σ | 0.2 ft 3σ; 0.3 ft peak |
| | Lateral Error | 0.3 ft 3σ | 0.3 ft 3σ; 0.3 ft peak |

The horizontal guidance may be the same from High Hover 106 to touchdown point 110. A feedback loop around the touchdown relative position estimate may be used to drive the relative position to zero. Block diagrams for horizontal estimation and guidance are shown in FIGS. 13a and 13b. Specifically, FIG. 13a illustrates a block diagram for horizontal touchdown tracking guidance when operating high above the deck, while FIG. 13b illustrates a block diagram for horizontal touchdown tracking guidance when operating near the deck In the last four landing phases, there are two hover phases and two descent phases. The two hover phases use height over deck guidance, which is a feedback loop around range to the deck measured by flash LIDAR 532. The block diagrams for providing Height Over Deck Control 536 guidance are illustrated in FIGS. 14*a* and 14*b*. Specifically, FIG. 14*a* illustrates a block diagram for providing Height Over Deck guidance 536 when operating high above the deck, while FIG. 14*b* illustrates a block diagram for providing Height Over Deck guidance 536 when operating near the deck. The closed-loop dynamics may be damped by a range rate measurement. In low hover 108, the range rate measurement comes from the Doppler velocity sensor. In high hover 106, the Doppler velocity sensor 304 may be unreliable because its beams may extend beyond the edge of the deck. For this reason, the filtered numerical derivative of flash LIDAR 532 range can be used as the range rate measurement in high hover.

Indirect Vessel Motion Conditioning.

Figure 15:
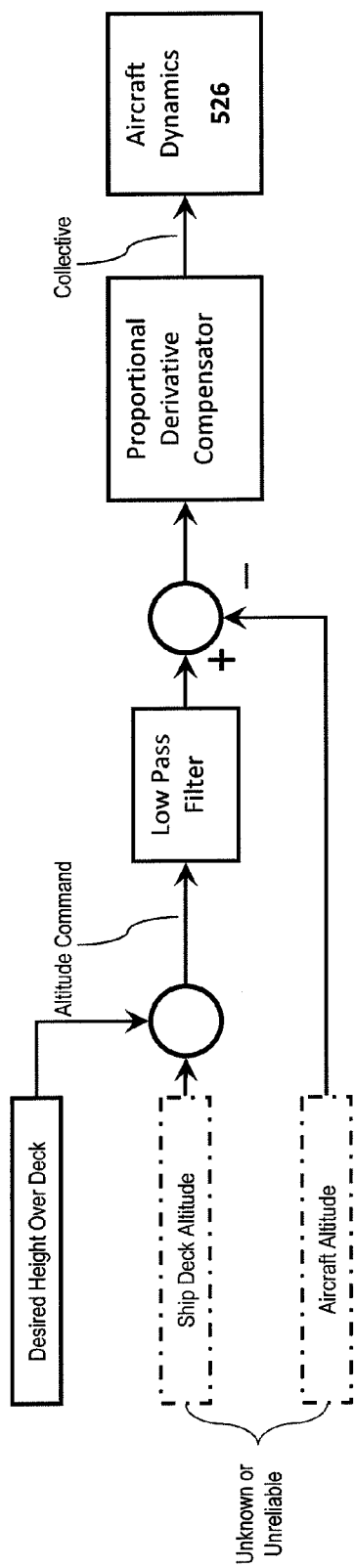
FIG. 15 illustrates an example block diagram of a first height-over-deck control system.
Figure 16:
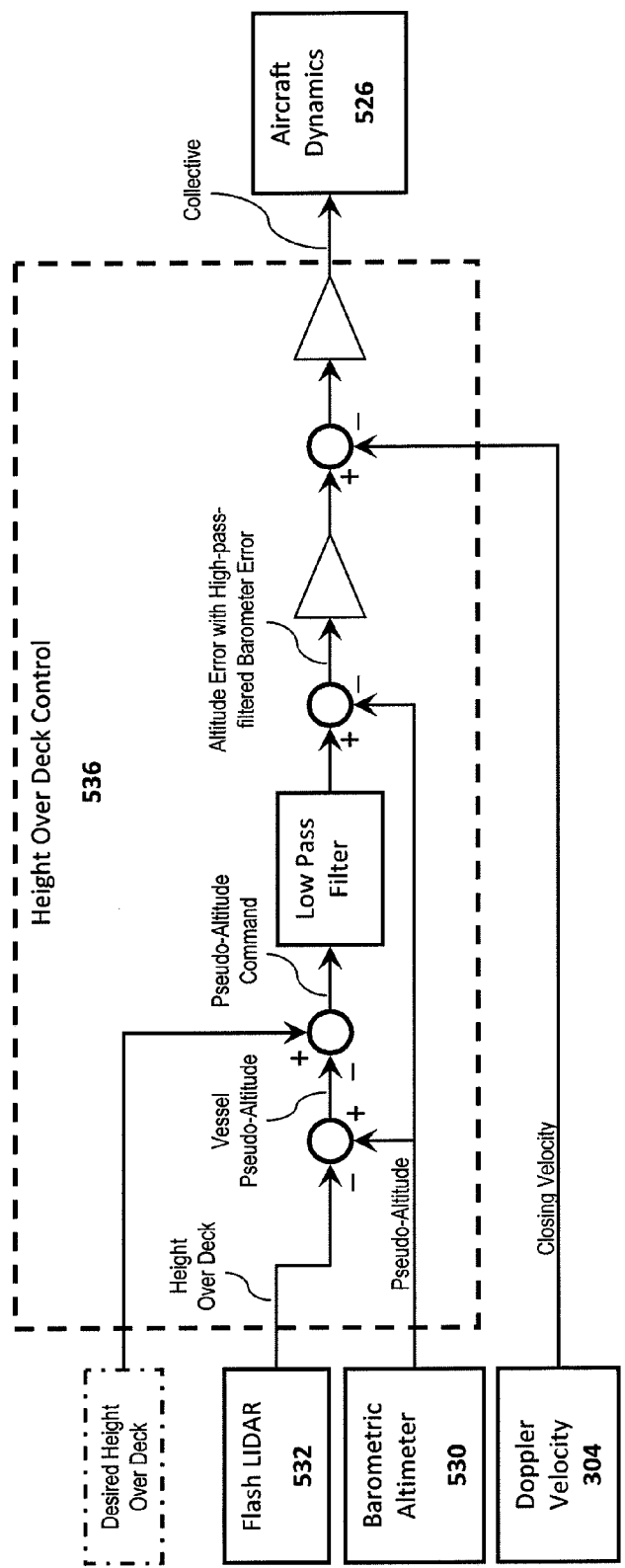
FIG. 16 illustrates an example block diagram of a second height-over-deck control system.

To minimize large error values resulting from saturation of the collective input, the vertical vessel motion that the aircraft is attempting to track may be conditioned. By filtering out the higher frequency content of the vessel motion, the aircraft may be able to track without saturating the collective input. As illustrated in FIG. 15, this solution is not easily implemented using prior techniques because the absolute deck altitude and the absolute aircraft altitude are usually both unknown. Relative vessel position may be directly measurable but it is necessary to separate the vessel motion from aircraft motion in order to put into effect the vessel motion filter. However, as illustrated in FIG. 16, a method of indirect vessel motion filtering may be employed to provide Height Over Deck Control 536. For example, a Barometric Altimeter 530 may be used to provide a pseudo-altitude reference that may be added and subtracted from both sides of the vessel motion filter. The Barometric Altimeter 530 output may be referred to as a pseudo-altitude reference because it is not a reliable source of absolute altitude. Because of this, the indirect vessel motion filtering approach may be designed to be robust to Barometric Altimeter 530 bias and drift. The addition and subtraction of the barometric altitude reading from both sides of the low-pass filter, in effect high-pass filters the barometer altitude measurement. Consequently, the effects of Barometric Altimeter 530 bias and drift are filtered out of the control system, leaving the differentiator that may isolate vessel motion from aircraft motion so that the high-frequency content of the vessel motion can be filtered out of the aircraft relative altitude guidance system.

The proposed height-over-deck guidance algorithms were implemented in 6DOF simulation. The performance is summarized in Table G. The difference in tracking performance between High Hover 106 and Low Hover 108 shows the performance degradation due to using the filtered numerical derivative of flash LIDAR 532 instead of Doppler velocity as the closing rate feedback.

TABLE G

| Phase | Performance Metric | Bias | Oscillation |
| --- | --- | --- | --- |
| High Hover | Altitude Error | 0.3 ft 3σ | 3.6 ft 3σ; 4.1 ft peak |
| Low Hover | Altitude Error | 0.3 ft 3σ | 1.4 ft 3σ; 2.6 ft peak |

Figure 17A:
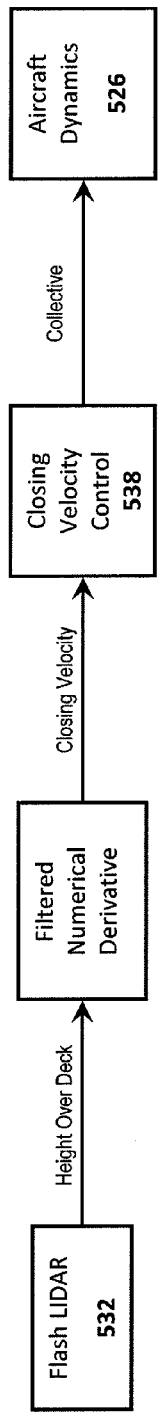
FIG. 17a illustrates a block diagram for closing rate guidance when operating high above the deck.
Figure 17B:
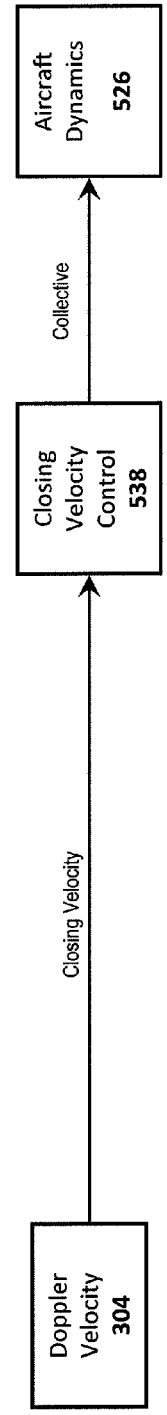
FIG. 17b illustrates a block diagram for closing rate guidance when operating near the deck.

The two descent phases use closing rate guidance. A feedback loop may be closed around the measured closing rate. A constant closing rate may be commanded until the end of each descent phase. The closing rate may be measured using the Doppler velocity sensor 304 in the Final Descent Phase. Filtered, numerically differentiated flash LIDAR 532 range may be used as the closing rate measurement in the Initial Descent Phase. The Initial Descent Phase ends when the High Hover altitude may be reached. The Final Descent Phase ends at Touchdown. The block diagrams for providing Closing Rate Guidance 538 command are illustrated in FIGS. 17*a* and 17*b*. Specifically, FIG. 17*a* illustrates a block diagram for providing Closing Rate Guidance 538 command when operating high above the deck, while FIG. 17*b* illustrates a block diagram for providing Closing Rate Guidance 538 command when operating near the deck.

The closing rate guidance was implemented in 6DOF simulation. The tracking performance including the effect of sensor error is summarized in Table H. The difference between Intermediate Descent and Final Descent is the use of filtered numerical derivative instead of Doppler velocity.

TABLE H

| Phase | Performance Metric | Oscillation |
| --- | --- | --- |
| Intermediate Descent | Vertical velocity error | 2.4 ft/s 3σ; 2.8 ft/s peak |
| Final Descent | Vertical velocity error | 1.3 ft/s 3σ; 2.0 ft/s peak |

Touchdown Conditions.

The touchdown position error is primarily driven by the touchdown point estimation error that begins to increase at about 5 to 8 ft above the deck, when the deck is too close for the touchdown marker to be identifiable within the flash LIDAR 532 field of view. From that point onwards, the touchdown point estimate is propagated based on Doppler velocity measurements. Combining the effects of estimation error and control error, the touch-down position error is summarized in Table I.

TABLE I

| Phase | Performance Metric | Value |
| --- | --- | --- |
| Final Descent | Vertical contact velocity | 2.4 ft/s 3σ; 3.1 ft/s peak 1.2 ft/s 3σ; 1.2 ft/s peak 3.0 ft 3σ |
| | Horizontal contact velocity | |
| | Touchdown accuracy | |

Table J summarizes the total tracking performance (estimation and control) at the various phases in the landing operation. These values are based on the Average Sea State 4 vessel motion profile.

TABLE J

| Phase | Performance Metric | Bias | Oscillation |
| --- | --- | --- | --- |
| Perch Point 104 | Longitudinal Error | 10.0 ft 3σ | 1.5 ft 3σ; 1.5 ft peak |
| | Lateral Error | 3.7 ft 3σ | 1.1 ft 3σ; 1.1 ft peak |
| | Altitude Error | 6.0 ft 3σ | 0.3 ft 3σ; 0.3 ft peak |
| End of Traverse | Lateral Error | 5.4 ft 3σ | 0.3 ft 3σ; 0.3 ft peak |
| | Altitude Error | 6.0 ft 3σ | 0.3 ft 3σ; 0.3 ft peak |
| High Hover 106 | Longitudinal Error | 0.6 ft 3σ | 0.8 ft 3σ; 1.1 ft peak |
| | Lateral Error | 0.6 ft 3σ | 0.9 ft 3σ; 1.0 ft peak |
| | Altitude Error | 0.3 ft 3σ | 3.6 ft 3σ; 4.1 ft peak |
| Low Hover 108 | Longitudinal Error | 0.3 ft 3σ | 0.5 ft 3σ; 0.8 ft peak |
| | Lateral Error | 0.3 ft 3σ | 0.7 ft 3σ; 0.8 ft peak |
| | Altitude Error | 0.3 ft 3σ | 1.4 ft 3σ; 2.6 ft peak |
| Final Descent | Vertical contact velocity | 0 | 2.4 ft/s 3σ; 3.1 ft/s peak 1.2 ft/s 3σ; 1.2 ft/s peak 3.0 ft 3σ |
| | Horizontal contact velocity | 0 | |
| | Touchdown accuracy | 0 | |

Table K shows the performance degradation in more aggressive vessel motion. The Elevated Sea State 4 uses an 8 ft wave height as opposed to 6 ft wave height in the Average Sea State 4 case. The 3σ value for vertical contact velocity does not increase much at 2.9 ft/s, however the increase in peak value is significant at 5.1 ft/s. This can be attributed to the fact that the peak errors are caused by rare instances of actuator saturation, when the controller is physically unable to match the vessel movement. As indicated by the significant difference between the 3σ value and the peak value, the instances of peak value are very rare. In addition, the peak values for Elevated Sea State 4 are also less than the 6 ft/s design limit on the landing gear.

The "Bad Captain" case has the vessel moving at 15 knots, 45 deg across the waves. This is a very unlikely case because the Navy specifies guidelines for vessel speed and heading that enforce limits on vessel heading and speed during recovery operations. As a worst-case evaluation, the performance is also shown in Table K. Even in this extreme case, the 3σ values for contact velocity and touchdown accuracy are tolerable. Statistics indicate that for the Elevated Sea State 4 Bad Captain case, contact velocities in excess of 6 ft/s occur in only 1 out of every 500 landings.

TABLE K

| Performance Metric | Average Sea State 4 | Elevated Sea State 4 | Elevated Sea State 4 Bad Captain |
|---|---|---|---|
| Vertical contact velocity | 2.3 ft/s 3σ 3.0 ft/s peak | 2.9 ft/s 3σ 5.1 ft/s peak | 4.8 ft/s 3σ 9.6 ft/s peak |
| Horizontal contact velocity | 1.0 ft/s 3σ 1.0 ft/s peak | 1.0 ft/s 3σ 1.0 ft/s peak | 1.0 ft/s 3σ 1.0 ft/s peak |
| Touchdown accuracy | 3.0 ft 3σ | 3.9 ft 3σ | 4.2 ft 3σ |

The results suggest that the vessel may need to slow down to 5 knots in order to conduct an emergency landing operation in certain Sea State 4 conditions; this operation is approximately 5 minutes in duration. However, a possible method of avoiding these occasional peak values may be to time the initiation of Final Descent based on an estimate of the phase and period of the primary heave mode.

Vertical contact velocity may be driven by limitations in the VTOL dynamics. The peak errors occur when the vessel deck moves such that the aircraft cannot track even with the collective input saturated. The fact that the peak may be significantly greater than the 3σ value indicates that this occurrence is relatively rare and even then the peak contact velocity is well below the 6 ft/s value for which the landing gear may be rated. Horizontal contact velocity may be driven by the inherent lag in the lateral closed-loop control and is very manageable at 1.2 ft/s 3σ. The performance of the guidance and estimation algorithms was evaluated based on actual manufacturers' sensor specifications and a Fire Scout flight dynamics model. The simulation analysis used a Fire Scout dynamics model generated by Aviation and Missile Research Development and Engineering Center (AMRDEC) based on system identification performed on the actual Fire Scout aircraft. The Large Amplitude Motion Program (LAMP), a high-fidelity vessel motion simulator from Science Applications International Corporation (SAIC), was used to generate average and Elevated Sea State 4 vessel motion conditions. Results showed satisfactory tracking and landing performance in average and Elevated Sea State 4 conditions.

While the present invention has been described with respect to what is presently considered to be the preferred embodiments, it is to be understood that the invention is not limited to the disclosed embodiments. To the contrary, the invention is intended to cover various modifications and equivalent arrangements included within the spirit and scope of the appended claims. The scope of the following claims is to be accorded the broadest interpretation so as to encompass all such modifications and equivalent structures and functions.

All documents cited herein, including journal articles or abstracts, published or corresponding U.S. or foreign patent applications, issued or foreign patents, or any other documents, are each entirely incorporated by reference herein, including all data, tables, figures, and text presented in the cited documents.

What is claimed is:

1. A method of determining a vessel-relative off-deck waypoint (VRODW) location for an aircraft in flight, the method comprising:
    determining a vessel range and a vessel bearing of a vessel relative to the aircraft using a sensor;
    tracking an altitude of the aircraft relative to the vessel by isolating vertical motion of the vessel from vertical motion of the aircraft, wherein vertical motion of the vessel is isolated using a pseudo-altitude reference value;
    determining the VRODW location as a function of the vessel range and the vessel bearing; and
    maintaining the aircraft in flight at the VRODW location until the vessel sends to the aircraft a land command through a communications link.

2. The method of claim 1, wherein the VRODW located aft of the vessel.

3. The method of claim 1, wherein the aircraft is a vertical take-off and landing (VTOL) aircraft.

4. The method of claim 1, wherein the aircraft determines the vessel range and vessel bearing.

5. The method of claim 1, further comprising:
    determining aircraft groundspeed and aircraft position in a local coordinate frame; and
    determining vessel position and vessel velocity in the local coordinate frame from the vessel range, vessel bearing, aircraft groundspeed, and aircraft position determinations.

6. The method of claim 5, wherein aircraft groundspeed is determined using onboard Doppler radar, inertial navigation, satellite navigation, GPS, radio navigation, radio direction finding, or any combination thereof.

7. The method of claim 5, wherein the aircraft position is determined by propagating aircraft groundspeed, inertial navigation, satellite navigation, GPS, radio navigation, radio direction finding, or any combination thereof.

8. The method of claim 5, wherein the vessel position and vessel velocity are determined using an algorithm.

9. The method of claim 8, wherein the algorithm comprises a Kalman filter, extended Kalman filter, unscented Kalman filter, particle filter, least-squares estimator, recursive estimation algorithm, or any combination thereof.

10. The method of claim 5, further comprising determining a vessel velocity vector, wherein the VRODW location is a fixed distance from the vessel along a negative vessel velocity vector.

11. The method of claim 1, wherein the vessel range and vessel bearing is determined using a radar sensor.

12. The method of claim 11, wherein the radar sensor comprises a pulse radar, pulse Doppler radar, high-range resolution radar, pulse-compression radar, synthetic aperture radar, inverse synthetic aperture radar, imaging radar, tracking radar, track-while-scan radar, 3 D radar, phased-array radar, continuous-wave radar, frequency-modulated continuous wave radar, or any combination thereof.

13. The method of claim 11, wherein the radar sensor is mounted onboard the aircraft.

14. The method of claim 1, wherein the aircraft performs autonomous landing.

15. The method of claim 1, wherein a barometric altimeter provides the pseudo-altitude reference value.

16. A method of landing an aircraft in flight at a vessel-relative off-deck waypoint (VRODW) location aft of a vessel, the method comprising:
   determining a vessel velocity vector;
   approaching the vessel from the VRODW location along the vessel velocity vector after the aircraft receives a land command from the vessel through a communications link;
   identifying a landing area of the vessel using a sensor;
   hovering the aircraft above the landing area;
   tracking an altitude of the aircraft relative to the landing area by filtering vertical motion of the vessel from vertical motion of the aircraft, wherein vertical motion of the vessel is filtered using a pseudo-altitude reference value;
   descending to the landing area as a function of said pseudo-altitude reference value; and
   landing the aircraft on the vessel.

17. The method of claim 16, wherein the aircraft is a vertical take-off and landing (VTOL) aircraft.

18. The method of claim 16, wherein determining the vessel velocity vector comprises:
   determining vessel range and vessel bearing;
   determining aircraft groundspeed and aircraft position in a local coordinate frame; and
   determining vessel position and vessel velocity in the local coordinate frame using the vessel range, vessel bearing, aircraft groundspeed and aircraft position.

19. The method of claim 16, wherein a barometric altimeter provides the pseudo-altitude reference value.

20. A method of landing an aircraft in flight at a vessel-relative off-deck waypoint (VRODW) location aft of a vessel, the method comprising:
   navigating the aircraft to the vessel from the VRODW location in response to a land command from the vessel to the aircraft through a communications link;
   identifying a landing area of the vessel using LIDAR;
   hovering the aircraft above the landing area;
   filtering vertical motion of the vessel from vertical motion of the aircraft, wherein vertical motion of the vessel is filtered using a pseudo-altitude reference value;
   descending the aircraft to the landing area as a function of said pseudo-altitude reference value; and
   landing the aircraft on the vessel at the landing area.

21. The method of claim 20, wherein the aircraft is a vertical take-off and landing (VTOL) aircraft.

22. The method of claim 20, wherein the LIDAR is scanning or flash LIDAR.

23. The method of claim 20, wherein the landing area is designated on the vessel by a symbol.

24. The method of claim 23, wherein the symbol is a circle, a cross, a H-shape, or other conventional symbols used on vessels to designate a landing area.

25. The method of claim 20, further comprising identifying a touchdown marker within the landing area.

26. The method of claim 20, wherein a barometric altimeter provides the pseudo-altitude reference value.

27. A method of landing an aircraft on a vessel comprising:
   determining a vessel range and a vessel bearing of the vessel using a sensor;
   identifying a vessel-relative off-deck waypoint (VRODW) location using the vessel range and vessel bearing;
   navigating the aircraft to the VRODW location;
   determining a vessel velocity vector;
   maintaining the aircraft in flight at the VRODW location until the vessel sends a land command to the aircraft through a communications link;
   approaching the vessel from the VRODW location along the vessel velocity vector upon receipt of the land command through the communications link;
   identifying a landing area on the vessel using LIDAR;
   tracking an altitude of the aircraft relative to the landing area by filtering vertical motion of the vessel from vertical motion of the aircraft, wherein vertical motion of the vessel is filtered using a pseudo-altitude reference value;
   hovering the aircraft above the landing area at a first altitude;
   descending the aircraft from the first altitude to a second altitude at a first descent speed;
   hovering the aircraft above the landing area at the second altitude;
   descending the aircraft from the second altitude to the landing area at a second descent speed; and
   landing the aircraft on the vessel at the landing area.

28. The method of claim 24, wherein the aircraft is a vertical take-off and landing (VTOL) aircraft.

29. The method of claim 27, wherein the aircraft performs the method autonomously.

* * * * *